(12) United States Patent
Hamada et al.

(10) Patent No.: US 8,989,391 B2
(45) Date of Patent: Mar. 24, 2015

(54) SECRET SHARING SYSTEM, SECRET SHARING APPARATUS, SECRET SHARING METHOD, SECRET SORTING METHOD AND SECRET SHARING PROGRAM

(75) Inventors: Koki Hamada, Tokyo (JP); Dai Ikarashi, Tokyo (JP); Koji Chida, Tokyo (JP); Katsumi Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 102 days.

(21) Appl. No.: 13/876,110

(22) PCT Filed: Oct. 3, 2011

(86) PCT No.: PCT/JP2011/072770
§ 371 (c)(1),
(2), (4) Date: Mar. 26, 2013

(87) PCT Pub. No.: WO2012/046692
PCT Pub. Date: Apr. 12, 2012

(65) Prior Publication Data
US 2013/0182836 A1    Jul. 18, 2013

(30) Foreign Application Priority Data

Oct. 6, 2010 (JP) ................................. 2010-226553
Sep. 5, 2011 (JP) ................................. 2011-192844

(51) Int. Cl.
*G06F 21/00* (2013.01)
*H04L 9/08* (2006.01)

(52) U.S. Cl.
CPC ..................................... *H04L 9/085* (2013.01)
USPC .......................................................... 380/286

(58) Field of Classification Search
None
See application file for complete search history.

(56) References Cited

U.S. PATENT DOCUMENTS

| 6,263,436 | B1 * | 7/2001 | Franklin et al. ............... 713/167 |
| 7,634,091 | B2 * | 12/2009 | Zhou et al. ..................... 380/277 |
| 8,024,274 | B2 * | 9/2011 | Parkes et al. .................... 705/64 |
| 8,457,305 | B2 * | 6/2013 | Lauter et al. ................... 380/28 |
| 8,468,351 | B2 * | 6/2013 | Boesgaard Sorensen .... 713/170 |

OTHER PUBLICATIONS

Dan Bogdanov, "How to securely perform computations on secret-shared data", 2007, pp. 20-30.*

(Continued)

*Primary Examiner* — Benjamin Lanier
(74) *Attorney, Agent, or Firm* — Oblon, McClelland, Maier & Neustadt, L.L.P.

(57) ABSTRACT

A secret sharing system according to the present invention includes N secret sharing apparatuses. The secret sharing system according to the present invention includes fragment replacement means and reshare means. The fragment replacement means selects a number, smaller than N, of secret sharing apparatuses, generates a bijection $\pi$ of $\{1, \ldots, K\} \rightarrow \{1, \ldots, K\}$ among the selected secret sharing apparatuses and designates a fragment $a_{\pi(k)i}$ recorded in a selected secret sharing apparatus as a k-th fragment (i represents an identification number that indicates a selected secret sharing apparatus). The reshare means performs reshare of fragments of a numeric value used as replacements by the fragment replacement means to determine new fragments.

14 Claims, 9 Drawing Sheets

(56) References Cited

OTHER PUBLICATIONS

Hiroki Koga, "A General Formula of the (t, n)—Threshold Visual Secret Sharing Scheme", 2002, Springer-Verlag Berlin Heidelberg, pp. 328-345.*

Yevgeniy Dodis, Lecture 1: Exposure-Resistent Cryptography, 2007, pp. 1-7.*

Pablo Azar, "Secret Sharing and Applications", 2009, pp. 83-86.*

Hamada, K., et al., "A Random Permutation Protocol on Three-Party Secure Function Evaluation," Computer Security Symposium, vol. 2, No. 9, pp. 561-566, (Oct. 12, 2010).

Chida, K., et al., "Efficient 3-Party Secure Function Evaluation and Its Application," IPSJ SIG Technical Report, vol. 2010-CSEC-48, No. 1, pp. 1-7, (Mar. 4, 2010).

Durstenfeld, R., "Algorithms 235: Random Permutation," Communications of the ACM, vol. 7, No. 7, pp. 420-421, (Jul. 1964).

Herzberg, A., et al., "Proactive Secret Sharing Or: How to Cope With Perpetual Leakage," CRYPTO-LNCS, vol. 963, pp. 339-352, (1998).

Luo, H., et al., "Ubiquitous and Robust Authentication Services for Ad Hoc Wireless Networks," UCLA-CSD-TR-200030, Total 40 Pages, (Oct. 2000).

International Search Report Issued Nov. 1, 2011 in PCT/JP11/72770 Filed Oct. 3, 2011.

* cited by examiner

Algorithm 1 Quicksort($A, p, r$)
1: return unless $p < r$
2: $q \leftarrow$ Partition($A, p, r$)  // Algorithm 2
3: Quicksort($A, p, q - 1$)
4: Quicksort($A, q + 1, r$)

Algorithm 2 Partition($A, p, r$)
1: $i \leftarrow p - 1$
2: for $j \leftarrow p$ to $r - 1$ do
3:   if $A[j] \leq A[r]$ then
4:     $i \leftarrow i + 1$
5:     swap($A[i], A[j]$)  // EXCHANGE $A[i]$ AND $A[j]$
6:   end if
7: end for
8: swap($A[i + 1], A[r]$)
9: return $i + 1$

US 8,989,391 B2

SECRET SHARING SYSTEM, SECRET SHARING APPARATUS, SECRET SHARING METHOD, SECRET SORTING METHOD AND SECRET SHARING PROGRAM

TECHNICAL FIELD

The present invention generally relates to an encryption application. In particular, it relates to a secret sharing system, a secret sharing apparatus, a secret sharing method, a secret sorting method and a secret sharing program for performing a functional calculation without disclosing input data.

BACKGROUND ART

As a method of yielding a particular calculation result without reconstructing an encrypted numeric value, there is a method referred to as secure computation (such as the method described in Non-patent literature 1). According to the method described in Non-patent literature 1, fragments of a numerical value are distributed among three secure computation apparatuses, which can hold the results of calculations such as addition, subtraction, constant sum, multiplication, constant multiplication, logical operations (NOT, AND, OR and exclusive-OR) and data format conversion (integer-to-binary) without reconstructing the original numeric value.

PRIOR ART LITERATURE

Non-Patent Literature

Non-patent literature 1: Koji Chida, Dai Ikarashi, Katsumi Takahashi, "Efficient 3-Party Secure Function Evaluation and Its Application", 48-th IPSJ SIG Technical Report, CSEC, pp. 1-7, Mar. 4, 2010.

SUMMARY OF THE INVENTION

Problems to be Solved by the Invention

However, the conventional technique has a problem that a plurality of pieces of data cannot be randomly replaced while concealing the association of the pieces of data. An object of the present invention is to provide a secure computation technique of outputting data that cannot be associated with a plurality of pieces of input data.

Means to Solve the Problems

The present invention relates to a secret sharing. In general, in a (k, n) secret sharing, a secret sharing system has two parameters k and n and divides a value to be concealed into n fragments in such a manner that gathering less than k of the n fragments does not lead to leakage of information concerning the original value but gathering k or more of the n fragments permits reconstruction of the original value. A secret sharing system according to the present invention comprises N secret sharing apparatuses $R_1, \ldots,$ and $R_N$. It is assumed that N represents an integer equal to or greater than 3, n represents an integer equal to or greater than 1 and equal to or smaller than N, M represents an integer equal to or greater than 1, m represents an integer equal to or greater than 1 and equal to or smaller than M, K represents an integer equal to or greater than 2, k represents an integer equal to or smaller than K, numeric values $A_1^{(1)}, \ldots, A_K^{(1)}, \ldots, A_1^{(M)}, \ldots,$ and $A_K^{(M)}$ are K×M numeric values whose fragments are recorded in the secret sharing apparatuses in a distributed manner, numeric values $A_K^{(1)}, \ldots,$ and $A_K^{(M)}$ are a group of k-th numeric values associated with each other, and $a_{kn}^{(m)}$ is a fragment of the numeric value $A_k^{(m)}$ recorded in an n-th secret sharing apparatus. The secret sharing system according to the present invention comprises selection means, fragment replacement means and reshare means. The selection means selects a number, equal to or greater than 2 and smaller than N, of secret sharing apparatuses. The fragment replacement means generates a bijection $\pi$ of $\{1, \ldots, K\} \to \{1, \ldots, K\}$ among the selected secret sharing apparatuses and designates fragments $a_{\pi(k)i}^{(1)}, \ldots,$ and $a_{\pi(k)i}^{(M)}$ of a group of $\pi(k)$-th numeric values associated with each other recorded in a selected secret sharing apparatus $R_i$ (i represents an identification number that indicates a selected secret sharing apparatus) as fragments of a group of k-th numeric values associated with each other. The reshare means performs reshare of the fragments $a_{\pi(k)i}^{(1)}, \ldots,$ and $a_{\pi(k)i}^{(M)}$ of numeric values $A_{\pi(k)}^{(1)}, \ldots,$ and $A_{\pi(k)}^{(M)}$ that are used as replacements by said fragment replacement means to determine new fragments $b_{k1}^{(1)}, \ldots, b_{kN}^{(1)}, \ldots, b_{k1}^{(M)}, \ldots,$ and $b_{kN}^{(M)}$ (this process will be referred to as a reshare, hereinafter). In the case where reshare of a group of numeric values is performed while maintaining the association of the numeric values associated with each other, the same bijection $\pi$ can be used to replace the fragments of the numeric values of the group of numeric values associated with each other.

The secret sharing system according to the present invention can further comprise initial information distribution means, initial multiplication means, checking distribution means, checking multiplication means and tamper detection means. The initial information distribution means determines fragments $p_{1n}, \ldots,$ and $p_{Kn}$ of each of K numeric values $P_1, \ldots,$ and $P_K$ that are not known to any of the secret sharing apparatuses $R_1, \ldots,$ and $R_N$ by a secure computation and records the fragments $p_{1n}, \ldots,$ and $p_{Kn}$ in a secret sharing apparatus $R_n$. The initial multiplication means determines fragments $s_{k1}, \ldots,$ and $s_{kN}$ of a numeric value $S_k$ that satisfies a relation that $S_k = P_k \times A_k^{(1)}$ for the secret sharing apparatuses $R_1, \ldots,$ and $R_N$ by a secure computation and records the fragments $s_{k1}, \ldots,$ and $s_{kN}$ in the secret sharing apparatuses $R_1, \ldots,$ and $R_N$ in a distributed manner. The checking distribution means generates fragments $q_{k1}, \ldots,$ and $q_{kN}$ of a numeric value $Q_k$ that satisfies a relation that $Q_k = P_{\pi(k)}$ for k=1 to K by a secure computation and records the fragments $q_{k1}, \ldots,$ and $q_{kN}$ in the secret sharing apparatuses $R_1, \ldots,$ and $R_N$ in a distributed manner. The checking multiplication means determines fragments $t_{k1}, \ldots,$ and $t_{kN}$ of a numeric value $T_k$ that satisfies a relation that $T_k = Q_k \times B_k^{(1)}$ for the secret sharing apparatuses $R_1, \ldots,$ and $R_N$ by a secure computation and records the fragments $t_{k1}, \ldots,$ and $t_{kN}$ in the secret sharing apparatuses $R_1, \ldots,$ and $R_N$ in a distributed manner. The tamper detection means checks whether a relation that $T_k = S_{\pi(k)}$ holds or not for k=1 to K.

For example, in a case where the secret sharing system comprises three secret sharing apparatuses, it is assumed that three fragments of an m-th numeric value $A_k^{(m)} = a_{k\alpha\beta}^{(m)} + a_{k\beta\gamma}^{(m)} + a_{k\gamma\alpha}^{(m)}$ of a group of k-th numeric values associated with each other are $(a_{k\gamma\alpha}^{(m)}, a_{k\alpha\beta}^{(m)})$, $(a_{k\alpha\beta}^{(m)}, a_{k\beta\gamma}^{(m)})$ and $(a_{k\beta\gamma}^{(m)}, a_{k\gamma\alpha}^{(m)})$ (a combination $(\alpha, \beta, \gamma)$ is any of combinations (1, 2, 3), (2, 3, 1) and (3, 1, 2)). It is further assumed that a fragment recorded in a secret sharing apparatus selected as a first secret sharing apparatus is $a_{k1}^{(m)} = (a_{k31}^{(m)}, a_{k12}^{(m)})$, a fragment recorded in a secret sharing apparatus selected as a second secret sharing apparatus is $a_{k2}^{(m)} = (a_{k12}^{(m)}, a_{k23}^{(m)})$, and a fragment recorded in a secret sharing apparatus selected as a third secret sharing apparatus is $a_{k3}^{(m)} = (a_{k23}^{(m)}, a_{k31}^{(m)})$. Each secret sharing apparatus can comprise a fragment replacement part, a first random number generation part, a second random number generation part, a first calculation part, a second calculation part, a third calculation part and a fragment update part. If the secret sharing apparatus is selected as the first secret sharing apparatus or the second secret sharing apparatus, the fragment replacement part generates a bijection $\pi$ of $\{1, \ldots, K\} \to \{1, \ldots, K\}$ and designates fragments of the numeric values of a group of $\pi(k)$-th numeric values associated with each other as fragments of the numeric values of the group of k-th numeric values associated with each other. If the secret sharing apparatus is the first secret sharing apparatus, the first random number generation part generates random numbers $b_{k31}^{(1)}, \ldots,$ and $b_{k31}^{(M)}$ for reshare of the fragments of the numeric values of the group of k-th numeric values associated with each other resulting from the designation and transmits the random numbers $b_{k31}^{(1)}, \ldots,$ and $b_{k31}^{(M)}$ to the third secret sharing apparatus. If the secret sharing apparatus is the second secret sharing apparatus, the second random number generation part generates random numbers $b_{k23}^{(1)}, \ldots,$ and $b_{k23}^{(M)}$ for reshare of the fragments of the numeric values of the group of k-th numeric values associated with each other and transmits the random numbers $b_{k23}^{(1)}, \ldots,$ and $b_{k23}^{(M)}$ to the third secret sharing apparatus. If the secret sharing apparatus is the first secret sharing apparatus, the first calculation part calculates a value $x_k^{(m)}$ according to $x_k^{(m)} = b_{k31}^{(m)} - a_{\pi(k)31}^{(m)}$ for m=1 to M for reshare of the fragments of the numeric values $x_k^{(1)}, \ldots,$ and $x_k^{(M)}$ of the group of k-th numeric values associated with each other and transmits the value to the second secret sharing apparatus. If the secret sharing apparatus is the second secret sharing apparatus, the second calculation part calculates a value $y_k^{(m)}$ according to $y_k^{(m)} = b_{k23}^{(m)} - a_{\pi(k)23}^{(m)}$ for m=1 to M for reshare of the fragments of the numeric values of the group of k-th numeric values associated with each other and transmits the value $y_k^{(1)}, \ldots,$ and $y_k^{(M)}$ to the first secret sharing apparatus. If the secret sharing apparatus is the first or second secret sharing apparatus, the third calculation part calculates a value $b_{k12}^{(m)}$ according to $b_{k12}^{(m)} = a_{\pi(k)12}^{(m)} - x_k^{(m)} - y_k^{(m)}$ for m=1 to M for reshare of the fragments of the numeric values of the group of k-th numeric values associated with each other. The fragment update part designates $(b_{k31}^{(m)}, b_{k12}^{(m)})$ as a fragment $b_{k1}^{(m)}$ if the secret sharing apparatus is the first secret sharing apparatus, designates $(b_{k12}^{(m)}, b_{k23}^{(m)})$ as a fragment $b_{k2}^{(m)}$ if the secret sharing apparatus is the second secret sharing apparatus, and designates $(b_{k23}^{(m)}, b_{k31}^{(m)})$ as a fragment $b_{k3}^{(m)}$ if the secret sharing apparatus is the third secret sharing apparatus. The fragment replacement parts of all the secret sharing apparatuses form the fragment replacement means of the secret sharing system. The first random number generation part, the second random number generation part, the first calculation part, the second calculation part, the third calculation part and the fragment update part form the reshare means of the secret sharing system.

Effects of the Invention

With the secret sharing system according to the present invention, any secret sharing apparatus that is not selected by the fragment replacement part does not know the bijection $\pi$ and therefore cannot know the association between the numeric values $A_1^{(1)}, \ldots, A_K^{(1)}, \ldots, A_1^{(M)}, \ldots,$ and $A_K^{(M)}$ and the numeric values $B_1^{(1)}, \ldots, B_K^{(1)}, \ldots, B_1^{(M)}, \ldots,$ and $B_K^{(M)}$. According to the present invention, a sorting algorithm based on comparison, such as quick sort, can be achieved by a secure computation without increasing the number of comparisons.

DETAILED DESCRIPTION OF THE EMBODIMENTS

Figure 1:
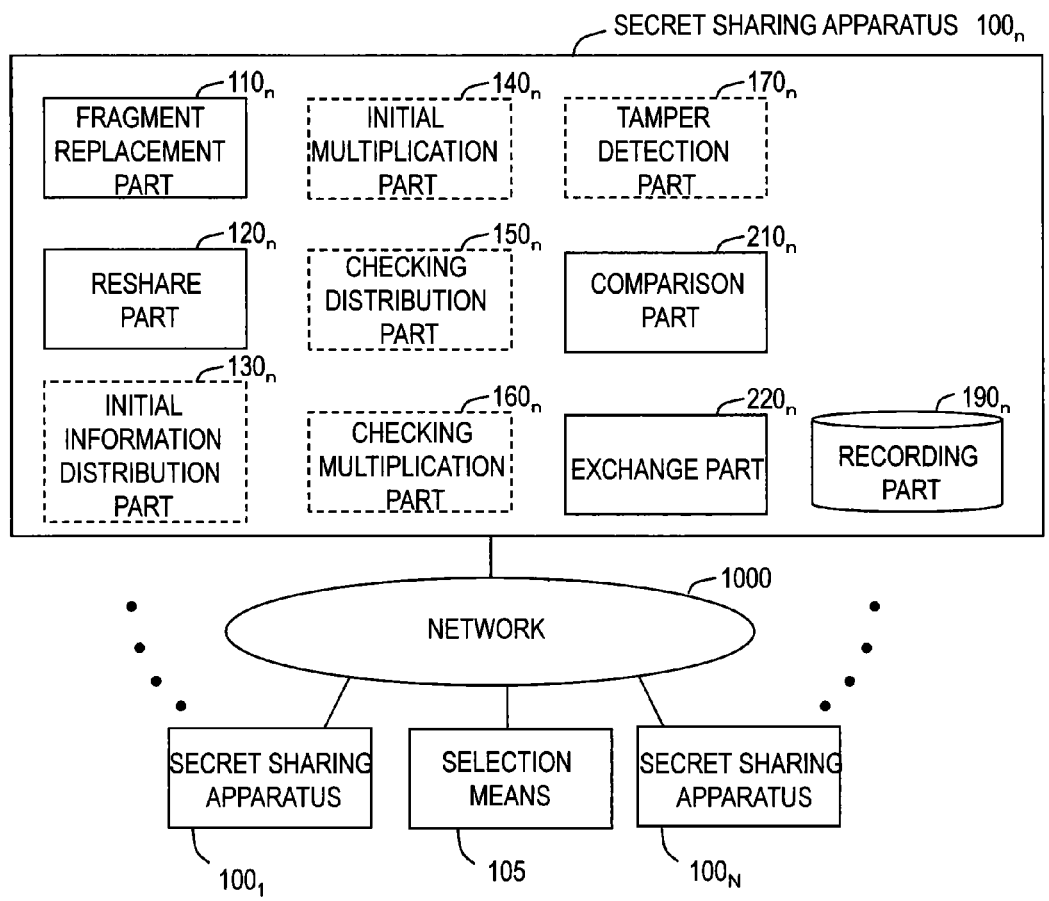
FIG. 1 is a diagram showing an example of a functional configuration of secret sharing systems according to first and second embodiments.

In the following, embodiments of the present invention will be described in detail. Components having the same functions will be denoted by the same reference numerals, and redundancy of the description thereof will be avoided.

First Embodiment

In the description of MEANS TO SOLVE THE PROBLEMS, it has been assumed that numeric values $A_1^{(1)}, \ldots, A_K^{(1)}, \ldots, A_1^{(M)}, \ldots, A_K^{(M)}$ are K×M numeric values whose fragments are to be distributed among and recorded in secret sharing apparatuses, the numeric values $A_k^{(1)}, \ldots,$ and $A_k^{(M)}$ are associated to form a k-th numeric value group, and a fragment of a numeric value $A_k^{(m)}$ to be recorded in an n-th secret sharing apparatus is denoted by $a_{kn}^{(m)}$. In the description of DETAILED DESCRIPTION OF THE EMBODIMENTS, to facilitate understanding of the present invention, a case where M=1 will be first described, and then a case where M is not limited to 1 will be described. In the description of the case where M=1, $A_k^{(1)}$ is expressed as $A_k$, and $a_{kn}^{(1)}$ is expressed as $a_{kn}$.

[Limited Shuffling]

Figure 2:
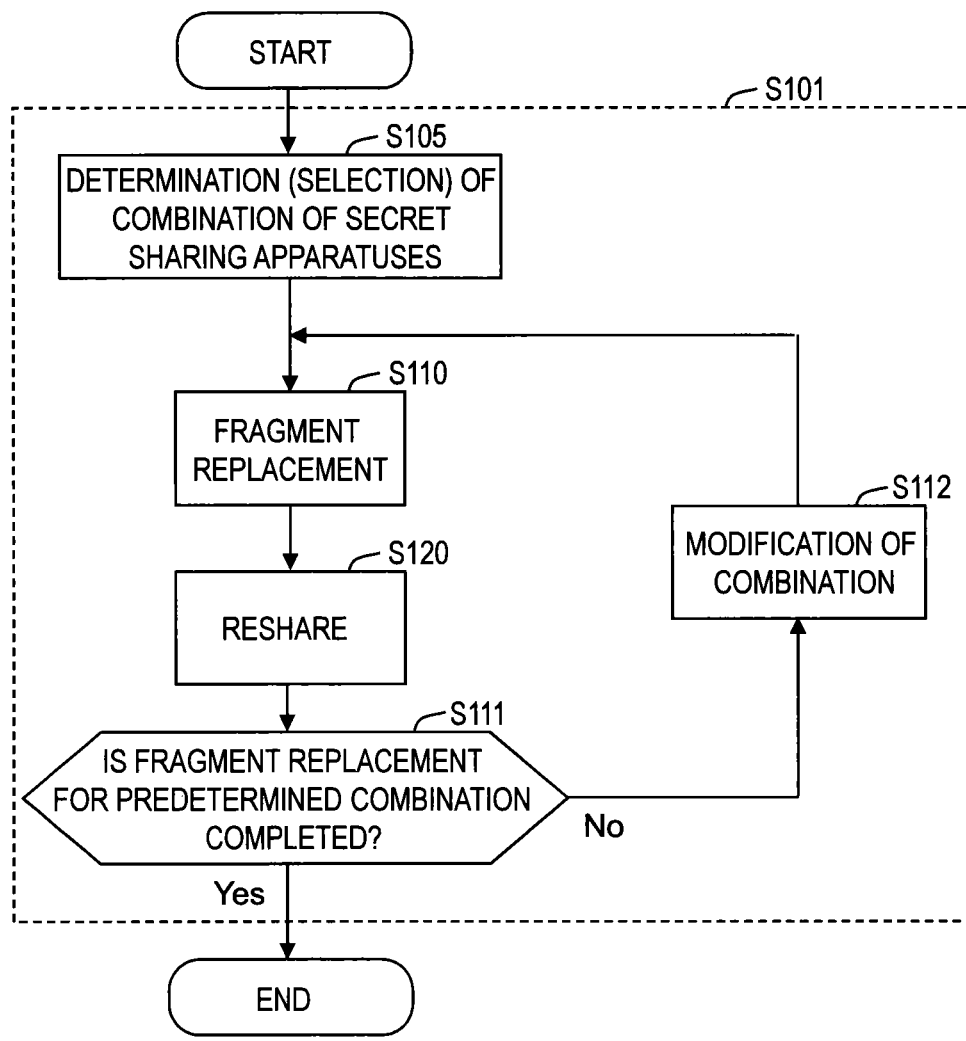
FIG. 2 is a diagram showing a flow of a secret sharing process performed by the secret sharing system according to the first embodiment.

FIG. 1 shows an example of a functional configuration of a secret sharing system according to the first embodiment. FIG. 2 shows a flow of a secret sharing process performed by the secret sharing system according to the first embodiment. The secret sharing system according to this embodiment comprises N secret sharing apparatuses $100_1, \ldots,$ and $100_N$ and selection means 105 connected to a network 1000 (N represents an integer equal to or greater than 3, and n represents an integer equal to or greater than 1 and equal to or smaller than N). $A_1, \ldots,$ and $A_K$ are K numeric values whose fragments are to be distributed among and recorded in the secret sharing apparatuses $100_n$ (K represents an integer equal to or greater than 2), a numeric value $A_k$ is a k-th numeric value (k represents an integer equal to or greater than 1 and equal to or smaller than K), and $a_{kn}$ represents a k-th fragment to be recorded in the secret sharing apparatus $100_n$. The numeric values $A_1, \ldots,$ and $A_K$ are a group of numeric values to be concealed, for example, a group of numeric values to be sorted. The group of numeric values to be sorted can be a group of numeric values $A_k$ each representing the annual income of a particular person. The selection means 105 may be provided in any of the secret sharing apparatuses or provided as a separate apparatus.

The secret sharing system according to this embodiment comprises the selection means, fragment replacement means and reshare means. The secret sharing apparatus $100_n$ comprises at least a fragment replacement part $110_n$, a reshare part $120_n$ and a recording part $190_n$. The recording part $190_n$ records fragments $a_{1n}, \ldots,$ and $a_{Kn}$, for example. The recording part $190_n$ also records information concerning what number fragment of the numeric value $A_k$ is the fragment $a_{kn}$ recorded in itself.

The selection means 105 selects a number, smaller than N, of secret sharing apparatuses (S105). For example, if the secret sharing requires N' of the N fragments to reconstruct the numeric value, it is enough that the fragment replacement means selects a number, equal to or greater than N' and smaller than N, secret sharing apparatuses.

The fragment replacement means comprises at least fragment replacement parts $110_1, \ldots,$ and $110_{N'}$. A bijection $\pi$ of $\{1, \ldots, K\} \to \{1, \ldots, K\}$ is generated among fragment replacement parts $110_i$ of secret sharing apparatuses $100_i$ (i represents the identification number of the selected secret sharing apparatus) selected by the selection means 105, and a fragment $a_{\pi(k)i}$ recorded in a recording part $190_i$ of the selected secret sharing apparatus $100_i$ is designated as the k-th fragment (S110). The bijection $\pi$ may be a mapping of numbers 1 to K randomly rearranged. The bijection $\pi$ is desirably a uniformly randomly rearranged mapping and can be generated by Fisher-Yates shuffle (Reference Literature 1: Richard Durstenfeld, "Algorithm 235: Random permutation", Communications of the ACM archive, Volume 7, Issue 7, 1964), for example. The bijection $\pi$ may be generated among the selected secret sharing apparatuses $100_i$ or may be generated by one of the selected secret sharing apparatuses $100_i$ and shared among the selected secret sharing apparatuses $100_i$.

The reshare means comprises at least reshare parts $120_1, \ldots, 120_{N'}$. The reshare means performs reshare of the fragments $a_{\pi(k)i}$ (a fragment $a_{\pi(k)i}$ is the k-th replaced fragment) of the numeric value $A_{\pi(k)}$ that are replacements used by the fragment replacement means to determine new fragments $b_{k1}, \ldots,$ and $b_{kN}$, and assumes the fragments $b_{k1}, \ldots,$ $b_{kN}$ as fragments of a numeric value $B_k$ (S120). That is, a relation that $A_{\pi(k)} = B_k$ holds. However, the secret sharing apparatuses that are not selected do not know the bijection $\pi$ and therefore the relation that $A_{\pi(k)} = B(k)$. The recording part $190_n$ of each secret sharing apparatus $100_n$ records not only the fragment $b_{kn}$ but also information that the k-th fragment $b_{kn}$ recorded in itself is a fragment of the numeric value $B_k$. Furthermore, if the numeric values $B_1, \ldots,$ and $B_K$ are regarded as new numeric values $A_1, \ldots,$ and $A_K$, and the combination of the secret sharing apparatuses selected by the fragment replacement means is modified, the process described above can be repeated (S111 and S112).

The secret sharing system according to the present invention shuffles the fragments among a limited number of secret sharing apparatuses. Therefore, the secret sharing apparatus that are not selected by the fragment replacement means do not know the bijection $\pi$ and therefore the association between the numeric values $A_1, \ldots,$ and $A_k$ and the numeric values $B_1, \ldots, B_k$. In other words, if one wants to conceal the association between the numeric values $A_1, \ldots,$ and $A_K$ and the numeric values $B_1, \ldots,$ and $B_K$ from a particular secret sharing apparatus, the secret sharing apparatuses to be selected can determined so that the fragment replacement means does not select that secret sharing apparatus. Furthermore, if the above process is repeated by modifying the combination of the secret sharing apparatuses selected by the fragment replacement means so that every secret sharing apparatus has experience of not being selected at least once, the numeric values $B_1, \ldots,$ and $B_K$ that cannot be associated with the numeric values $A_1, \ldots,$ and $A_K$ by all the secret sharing apparatuses can be obtained.

[Redistribution]

In the above description of limited shuffling, reshare has not been described in detail. In this section, a reshare method will be described. The reshare method involves the update method disclosed in Section 3.3 of Reference Literature 2 (Amir Herzberg, Stanislaw Jarecki, Hugo Krawczyk, and Moti Yung, "Proactive secret sharing or: How to cope with perpetual leakage", In Don Coppersmith, editor, CRYPTO 1995, volume 963 of LNCS, pages 339-352. Springer, 1995) and the regeneration method disclosed in Section 6.1 of Reference Literature 3 (Haiyun Luo and Songwu Lu, "Ubiquitous and robust authentication services for ad hoc wireless networks", In UCLA-CSD-TR-200030, 2000). New fragments are generated among the secret sharing apparatuses selected by the selection means 105 according to the update method disclosed in Reference Literature 2, and then, new fragments for the secret sharing apparatuses that are not selected by the selection means 105 are generated according to the regeneration method disclosed in Reference Literature 3.

An algorithm, which is an application of the update method disclosed in Reference Literature 2 to the present invention, will be described below. It is assumed that the selection means 105 has selected N' secret sharing apparatuses. It is further assumed that i and j represent numbers that identify the selected secret sharing apparatuses (any of the N' numbers selected from among 1 to N) and are not equal to each other ($j \neq i$). It is further assumed that values $z_1, \ldots,$ and $z_N$ are predetermined values and shared among all the secret sharing apparatuses.

(1) All the secret sharing apparatuses $100_i$ generate N'−1 random numbers $u_{i,1}, u_{i,2}, \ldots,$ and $u_{i,N'-1}$.

(2) All the secret sharing apparatuses $100_i$ determine $Z_i(z)$: $0 = +u_{i,1}z + u_{i,2}z^2 + \ldots + u_{i,N'-1}z^{N'-1}$.

(3) All the secret sharing apparatuses $100_i$ transmit the value of $Z_i(z_j)$ to all the other selected secret sharing apparatuses $100_j$ (there are N'−1 secret sharing apparatuses $100_j$ that are not selected).

(4) All the secret sharing apparatuses $100_i$ denote the sum of all the values of $Z_j(z_i)$ received from the other selected secret sharing apparatuses $100_j$ (there are N'−1 secret sharing apparatuses $100_j$ that are not selected) as $Z(z_i)$, and determine new fragments $b_{ki}$ using the replacement fragments $a_{\pi(k)i}$ according to the following formula:

$$b_{ki} = a_{\pi(k)i} + Z(z_i)$$

Next, an algorithm, which is an application of the regeneration method disclosed in Reference Literature 3 to the present invention, will be described. It is assumed that the "h" represents a number that identifies a secret sharing apparatus that is not selected (any of the N'-N numbers that are not selected from among 1 to N). It is further assumed that a relation that $L_{ij}(z)=(z-z_j)/(z_i-z_j)$ holds, and $L_i(z)$ is the product of the values of $L_{ij}(z)$ for all the numbers j.

(5) All the secret sharing apparatuses $100_i$ generate random numbers $v_{i,j}^{(h)}$ for all the combinations of the numbers j greater than i (i<j) and the secret sharing apparatuses $100_h$ that are not selected.

(6) All the secret sharing apparatuses $100_i$ transmit the random numbers $v_{i,j}^{(h)}$ to the secret sharing apparatuses $100_j$.

(7) For all the secret sharing apparatuses $100_h$ that are not selected, all the secret sharing apparatuses $100_i$ denote the sum of all the random numbers $v_{i,j}^{(h)}$ for i and j that satisfy a relation that j<i as $V^{(h+)}$ and the sum of all the random numbers $v_{i,j}^{(h)}$ for i and j that satisfy a relation that i<j as $V^{(h-)}$, determine a value $w_{hi}$ according to the following formula:

$$w_{hi}=b_{ki}L_i(z_h)+V^{(h+)}-V^{(h-)}$$

and transmit the value $w_{hi}$ to the secret sharing apparatuses $100_h$.

(8) All the secret sharing apparatuses $100_h$ regard the sum of all the received values $w_{hi}$ as their respective new fragments $b_{kh}$.

As described above, through the steps (1) to (4), all the selected secret sharing apparatuses record new fragments. Through the steps (5) to (8), all the secret sharing apparatus that are not selected record new fragments.

If the steps (3) and (6) are performed at the same time, the process can be sped up. More specifically, the steps (1), (2) and (5) can be first performed, then the steps (3) and (6) can be performed at the same time, and then the steps (4), (7) and (8) can be performed.

[Sorting]

Figures 3, 4:
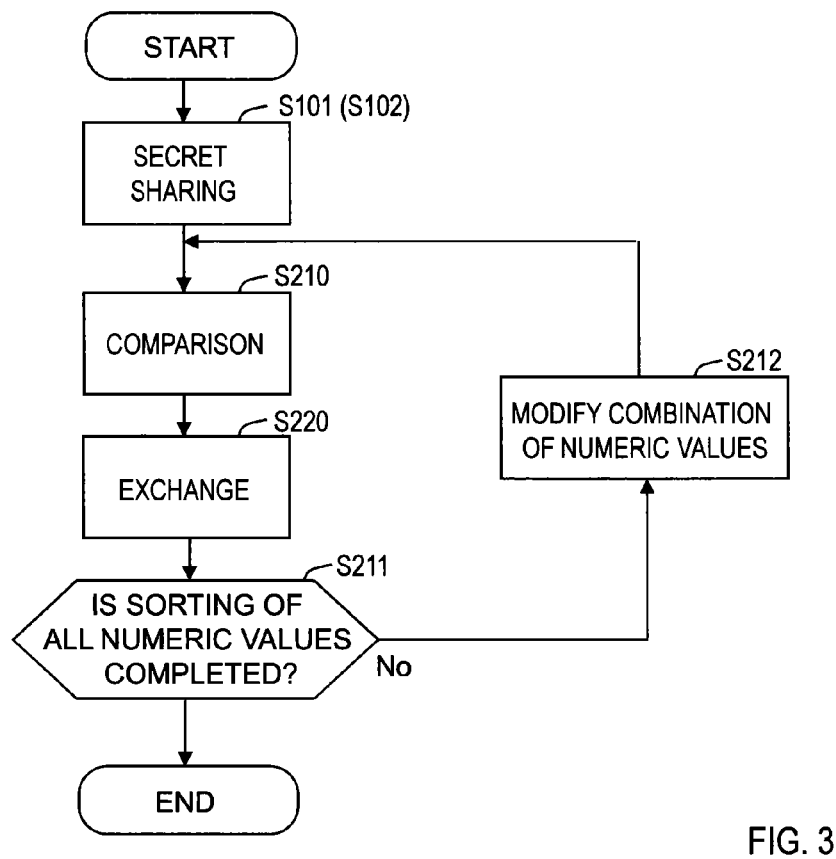
FIG. 3 is a diagram showing a flow of a process of sorting numeric values in the secret sharing systems according to the present invention.
FIG. 4 is a diagram showing a quick sort algorithm.

FIG. 3 shows a flow of a process of sorting numeric values in the secret sharing system according to the first embodiment. Through the process described above, new numeric values $A_1, \ldots,$ and $A_K$ that cannot be associated with the initial numeric values $A_1, \ldots,$ and $A_K$ have been obtained (S101). In the case where sorting is also to be performed, the secret sharing apparatus $100_n$ further comprises a comparison part $210_n$ and an exchange part $220_n$. Comparison parts $210_1, \ldots,$ and $210_N$ select two numeric values and compare the two numeric values in terms of magnitude by a secure computation (S210).

Based on the result of comparison by the comparison parts $210_1, \ldots,$ and $210_N$, exchange parts $220_1, \ldots$ and $220_N$ exchange fragments of zero sets, one set or a plurality of sets of numeric values (S220). Then, until the sorting process is completed for all the numeric values, Steps S210 and S220 (required processings such as comparison, exchange and combination modification) are repeated (S211, S212).

The result of the comparison in Step S210 is information required for all the secret sharing apparatuses to perform the subsequent processing, and therefore all the secret sharing apparatuses know the information. However, since all the secret sharing apparatuses process the new numeric values $A_1, \ldots,$ and $A_K$ that cannot be associated with the initial numeric values $A_1, \ldots,$ and $A_K$ due to the processing of Step S101, the information concerning the initial numeric values $A_1, \ldots,$ and $A_K$ does not leak. The comparison result is also information that is available by calculation from the output of sorting process, which is public information. Therefore, in the whole protocol according to this embodiment, disclosing the comparison result does not mean leaking more information than required.

More specifically, the quick sort algorithm shown in FIG. 4 can be applied to the operations involved in sorting (Steps S210, S220, S211 and S212). In this case also, the processing of comparing A[i] and A[j] is performed by concealing the values of A[i] and A[j], and the comparison result is public. In the case of this method, the number of comparisons is the same as in the case of the original quick sort and is O(N·log N) on average. Besides, this embodiment can be applied to a sorting algorithm comprising a processing of comparing numeric values in terms of magnitude and a processing of exchanging two elements of an array.

As described above, with the secret sharing system according to this embodiment, the sorting algorithm comprising comparison and element exchange can be achieved by secure computation without increasing the number of comparisons.

[Modification of Limited Shuffling]

Next, the case where M is not limited to 1 will be described. It is assumed that M represents an integer equal to or greater than 1, and m represents an integer equal to or greater than 1 and equal to or smaller than M. It is further assumed that $A^{(1)}, \ldots,$ and $A^{(M)}$ are vectors each having K elements, and $A^{(m)}=(A_1^{(m)}, \ldots, A_K^{(m)})$. It is further assumed that the elements of the vectors $A^{(1)}, \ldots,$ and $A^{(M)}$ are associated with each other. In other words, it is assumed that $A_k^{(1)}, \ldots,$ and $A_k^{(M)}$ are a group of k-th numeric values associated with each other. In this modification, limited shuffling of the group of numeric values is performed while maintaining the association of the group of numeric values associated with each other. It is further assumed that $a_{kn}^{(m)}$ represents a fragment of a numeric value $A_k^{(m)}$ recorded in the secret sharing apparatus $100_n$. Note that the limited shuffling described above is the limited shuffling in the case where M=1, and the following description concerns more general limited shuffling.

The secret sharing system is configured as shown in FIG. 1, and the flow of the secret sharing process is as shown in FIG. 2. The secret sharing apparatus $100_n$ comprises at least the fragment replacement part $110_n$, the reshare part $120_n$ and the recording part $190_n$. However, the components are configured as described below and perform the processings described below.

The recording part $190_n$ records fragments $a_{1n}^{(1)}, \ldots, a_{Kn}^{(1)}, \ldots, a_{1n}^{(M)}, \ldots,$ and $a_{Kn}^{(M)}$, for example. The recording part $190_n$ also records information concerning what number fragment of the numeric value $A_k$ is the fragment $a_{kn}$ recorded in itself.

The selection means $105$ selects a number, smaller than N, of secret sharing apparatuses (S105). For example, if the secret sharing requires N' of the N fragments to reconstruct the numeric value, it is enough that the fragment replacement means selects a number, equal to or greater than N' and smaller than N, secret sharing apparatuses. This processing is the same as that described above.

The fragment replacement means comprises at least fragment replacement parts $110_1, \ldots,$ and $110_N$. A bijection $\pi$ of $\{1, \ldots, K\} \to \{1, \ldots, K\}$ is generated among fragment replacement parts $110_i$ of secret sharing apparatuses $100_i$ (i represents the identification number of the selected secret sharing apparatus) selected by the selection means $105$, and fragments $a_{\pi(k)i}^{(1)} \ldots,$ and $a_{\pi(k)i}^{(M)}$ recorded in the recording part $190i$ of the selected secret sharing apparatus $100_i$ is designated as fragments of the group of k-th numeric values associated with each other (S110).

The reshare means comprises at least reshare parts $120_1, \ldots, 120_N$. The reshare means performs reshare of the fragments $a_{\pi(k)i}^{(1)}, \ldots,$ and $a_{\pi(k)i}^{(M)}$ (fragments $a_{\pi(k)i}^{(1)}, \ldots,$ and $a_{\pi(k)i}^{(M)}$ are the k-th replaced fragments) of the group of numeric values $A_{\pi(k)}^{(1)}, \ldots,$ and $A_{\pi(k)}^{(M)}$ that are replacements used by the fragment replacement means to determine new fragments $b_{k1}^{(1)}, \ldots, b_{kN}^{(1)}, \ldots, b_{k1}^{(M)}, \ldots,$ and $b_{kN}^{(M)}$, and assumes the fragments $b_k^{(1)}, \ldots, b_{kN}^{(1)}, \ldots, b_k^{(M)}, \ldots,$ and $b_{kN}^{(M)}$ as fragments of numeric values $B_k^{(1)}, \ldots,$ and $B_k^{(M)}$ (S120). That is, a relation that $A_{\pi(k)}^{(m)} = B_k^{(m)}$ holds. However, the secret sharing apparatuses that are not selected do not know the bijection π and therefore the relation that $A_{\pi(k)}^{(m)} = B_k^{(m)}$. The recording part $190_n$ of each secret sharing apparatus $100_n$ records not only the fragment $b_{kn}^{(m)}$ but also information that the k-th fragment $b_{kn}^{(m)}$ recorded in itself is a fragment of the numeric value $B_k^{(m)}$. Furthermore, if the numeric values $B_1^{(1)}, \ldots, B_K^{(1)}, \ldots, B_1^{(M)}, \ldots,$ and $B_K^{(M)}$ are regarded as new numeric values $A_1^{(1)}, \ldots, A_K^{(1)}, \ldots, A_1^{(M)}, \ldots,$ and $A_K^{(M)}$, and the combination of the secret sharing apparatuses selected by the fragment replacement means is modified, the process described above can be repeated (S111 and S112).

As described above, if the limited shuffling in which the association of the elements of the vectors is maintained is used, random replacement in the column direction can be performed by regarding each row as one element (a group of numeric values associated with each other) in secret sharing of data in the form of a table, for example.

Second Embodiment

[Limited Shuffling]

Figure 5:
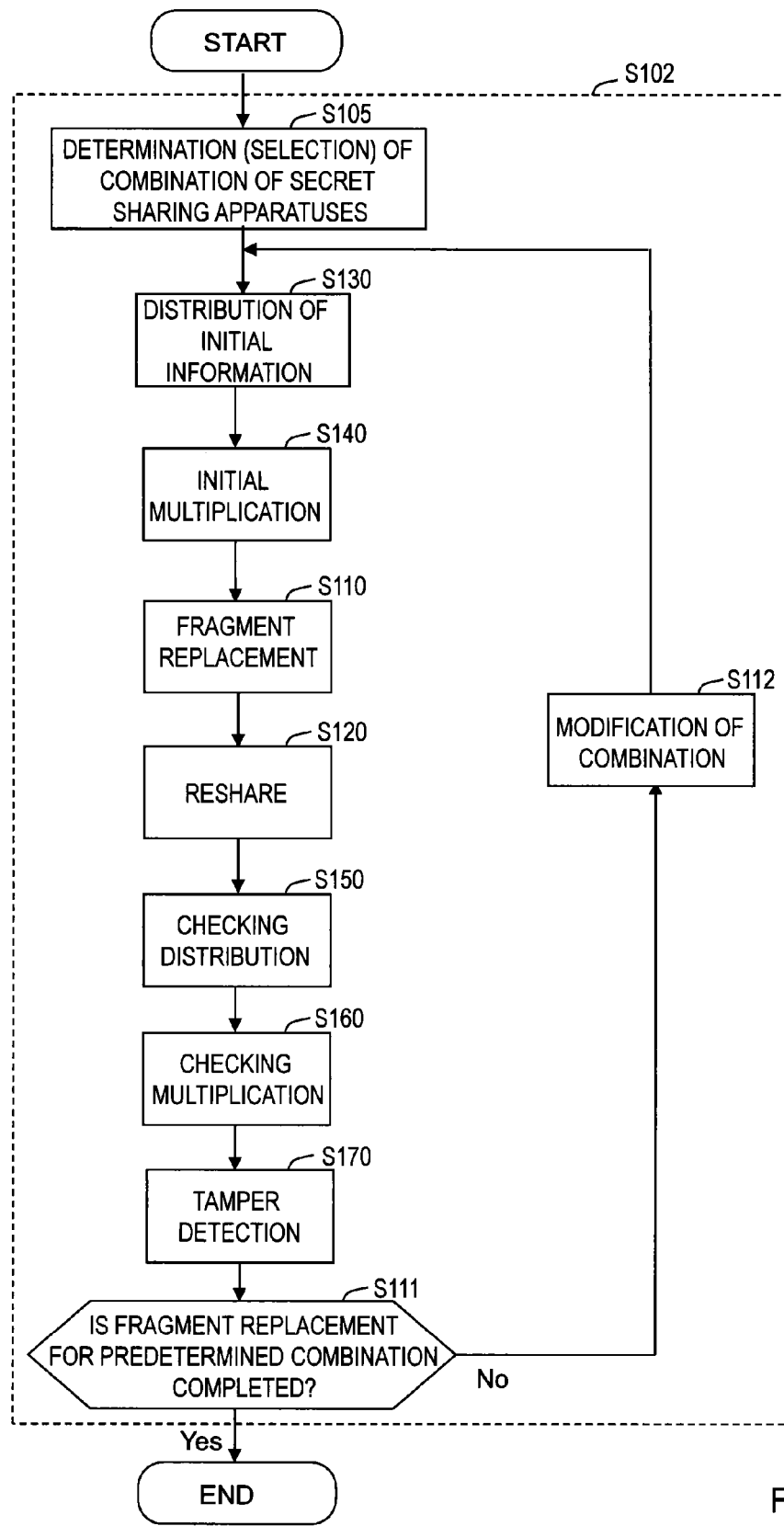
FIG. 5 is a diagram showing a flow of a secret sharing process performed by the secret sharing system according to the second embodiment.

A secret sharing system according to a second embodiment is configured as shown in FIG. 1. A secret sharing apparatus $100_n$ according to this embodiment further comprises the components shown by dotted lines. FIG. 5 shows a flow of a secret sharing process performed by the secret sharing system according to the second embodiment. The secret sharing system according to this embodiment comprises N secret sharing apparatuses $100_1, \ldots,$ and $100_N$ and selection means 105 connected to a network 1000 (N represents an integer equal to or greater than 3, and n represents an integer equal to or greater than 1 and equal to or smaller than N). $A_1, \ldots,$ and $A_K$ are K numeric values whose fragments are to be distributed among and recorded in the secret sharing apparatuses $100_n$ (K represents an integer equal to or greater than 2), a numeric value $A_k$ is a k-th numeric value (k represents an integer equal to or greater than 1 and equal to or smaller than K), and $a_{kn}$ represents a k-th fragment to be recorded in the secret sharing apparatus $100_n$.

The secret sharing system according to this embodiment comprises the selection means 105, initial information distribution means, initial multiplication means, fragment replacement means, reshare means, checking distribution means, checking multiplication means, and tamper detection means. The secret sharing apparatus $100_n$ comprises an initial information distribution part $130_n$, an initial multiplication part $140_n$, a fragment replacement part $110_n$, a reshare part $120_n$, a checking distribution part $150_n$, a checking multiplication part $160_n$, a tamper detection part $170_n$, and a recording part $190_n$. The recording part $190_n$ records fragments $a_{1n}, \ldots, a_{Kn}$, for example. The recording part $190_n$ also records information concerning what number fragment of the numeric value $A_k$ is the fragment $a_{kn}$ recorded in itself.

The selection means 105 is the same as that according to the first embodiment. The initial information distribution means comprises initial information distribution parts $130_1, \ldots,$ and $130_N$. The initial information distribution part $130_i$ of the secure computation apparatus $100_i$ selected by the selection means 105 determines fragments $p_{11}, \ldots, p_{K1}, \ldots, p_{1n}, \ldots, p_{Kn}, \ldots, p_{1N}, \ldots,$ and $p_{KN}$ of K numeric values $P_1, \ldots,$ and $P_K$ that are not known to all the secret sharing apparatuses $100_1, \ldots,$ and $100_N$, and the fragments $p_{1n}, \ldots,$ and $p_{Kn}$ are recorded in the secret sharing apparatus $100_n$ (S130). Specifically, two or more secret sharing apparatuses are chosen from among the secret sharing apparatuses selected by the selection means 105. Then, based on the values generated by the chosen secret sharing apparatuses, fragments of the values that are not known to any apparatuses can be generated. For example, two secret sharing apparatuses $100_i$ and $100_j$ are chosen (i≠j), and fragments of the numeric value generated by the secret sharing apparatus $100_i$ and fragments of the numeric value generated by the secret sharing apparatus $100_j$ are recorded in a distributed manner. Then, the sum of the two numeric values is determined by a secure computation, and the fragments are recorded in a distributed manner so that the result of the secure computation is concealed. Then, the fragments of the numeric values that are not known to all the secret sharing apparatuses can be recorded in a distributed manner. Although two secure computation apparatuses are chosen in this example, more than two secure computation apparatuses can also be chosen.

The initial multiplication means comprises initial multiplication parts $140_1, \ldots,$ and $140_N$. The initial multiplication parts $140_1, \ldots,$ and $140_N$ determine fragments $s_{k1}, \ldots,$ and $s_{kN}$ of a numeric value $S_k$ that satisfies a relation that $S_k = P_k \times A_k$, and the fragments are distributed among and recorded in the secret sharing apparatuses $100_1, \ldots,$ and $100_N$.

The fragment replacement means and the reshare means are the same as those according to the first embodiment. The checking distribution means comprises checking distribution parts $150_1, \ldots,$ and $150_N$. The checking distribution parts $150_1, \ldots,$ and $150_N$ generate fragments $q_{k1}, \ldots,$ and $q_{kN}$ of a numeric value $Q_k$ that satisfies a relation that $Q_k = P_{\alpha(k)}$ for k=1 to K by a secure computation, and the fragments are distributed among and recorded in the secret sharing apparatuses $100_1, \ldots,$ and $100_N$ (S150). Specifically, based on the values generated by the chosen secret sharing apparatuses in Step S130, other fragments of the values that are not known to any apparatuses can be generated. For example, other fragments (new fragments) of the numeric value generated for the numeric value $P_{\pi(k)}$ by the chosen secret sharing apparatus $100_i$ in Step S130 and other fragments (new fragments) of the numeric value generated for the numeric value $P_{\pi(k)}$ by the chosen secret sharing apparatus $100_j$ in Step S130 are recorded in a distributed manner. Then, the sum of the two numeric values is determined by a secure computation, and the fragments are recorded in a distributed manner so that the result of the secure computation is concealed. Then, fragments of the numeric value $Q_k$ that satisfies a relation that $Q_k = P_{\pi(k)}$ and is not known to all the secret sharing apparatuses can be recorded in a distributed manner. Although two secure computation apparatuses are chosen in this example, more than two secure computation apparatuses can also be chosen as in Step S130.

The checking multiplication means comprises checking multiplication parts $160_1, \ldots,$ and $160_N$. The checking multiplication parts $160_1, \ldots,$ and $160_N$ determine fragments $t_{k1}, \ldots,$ and $t_{kN}$ of a numeric value $T_k$ that satisfies a relation that $T_k = Q_k \times B_k$ by a secure computation, and the fragments $t_{k1}, \ldots,$ and $t_{kN}$ are distributed among and recorded in the secret sharing apparatuses $100_1, \ldots,$ and $100_N$ (S160).

The tamper detection means comprises tamper detection parts $170_1, \ldots,$ and $170_N$. The tamper detection parts $170_1, \ldots,$ and $170_N$ checks whether a relation that $T_k = S_{\pi(k)}$ holds for k=1 to K (S170). If $t_{kn} \neq s_{\pi(k)n}$, it is determined that there a tamper has occurred, and abnormal termination occurs. If the numeric values $B_1, \ldots,$ and $B_K$ are regarded as new numeric values $A_1, \ldots,$ and $A_K$, and the combination of the secret sharing apparatuses selected by the fragment replacement means is modified, the process described above can be repeated (S111, S112).

The secret sharing system according to the second embodiment has the same effects as the secret sharing system according to the first embodiment and can check whether an illegal operation to transmit a tampered value to other secret sharing apparatuses has occurred in the course of a process of concealing the association between the numeric values $A_1, \ldots,$ and $A_K$ and the numeric values $B_1, \ldots,$ and $B_K$. In the case where sorting is also to be performed, the secret sharing apparatus $100_n$ further comprises a comparison part $210_n$ and an exchange part $220_n$. The specific sorting process is the same as that according to the first embodiment.

Third Embodiment

In the first and second embodiments, it has been assumed that the number of the secret sharing apparatuses is N (N represents an integer equal to or greater than 3). However, in a third embodiment, the number of the secret sharing apparatuses that form the secret sharing system is limited to 3 for more specific description.

[Limited Shuffling]

Figure 6:
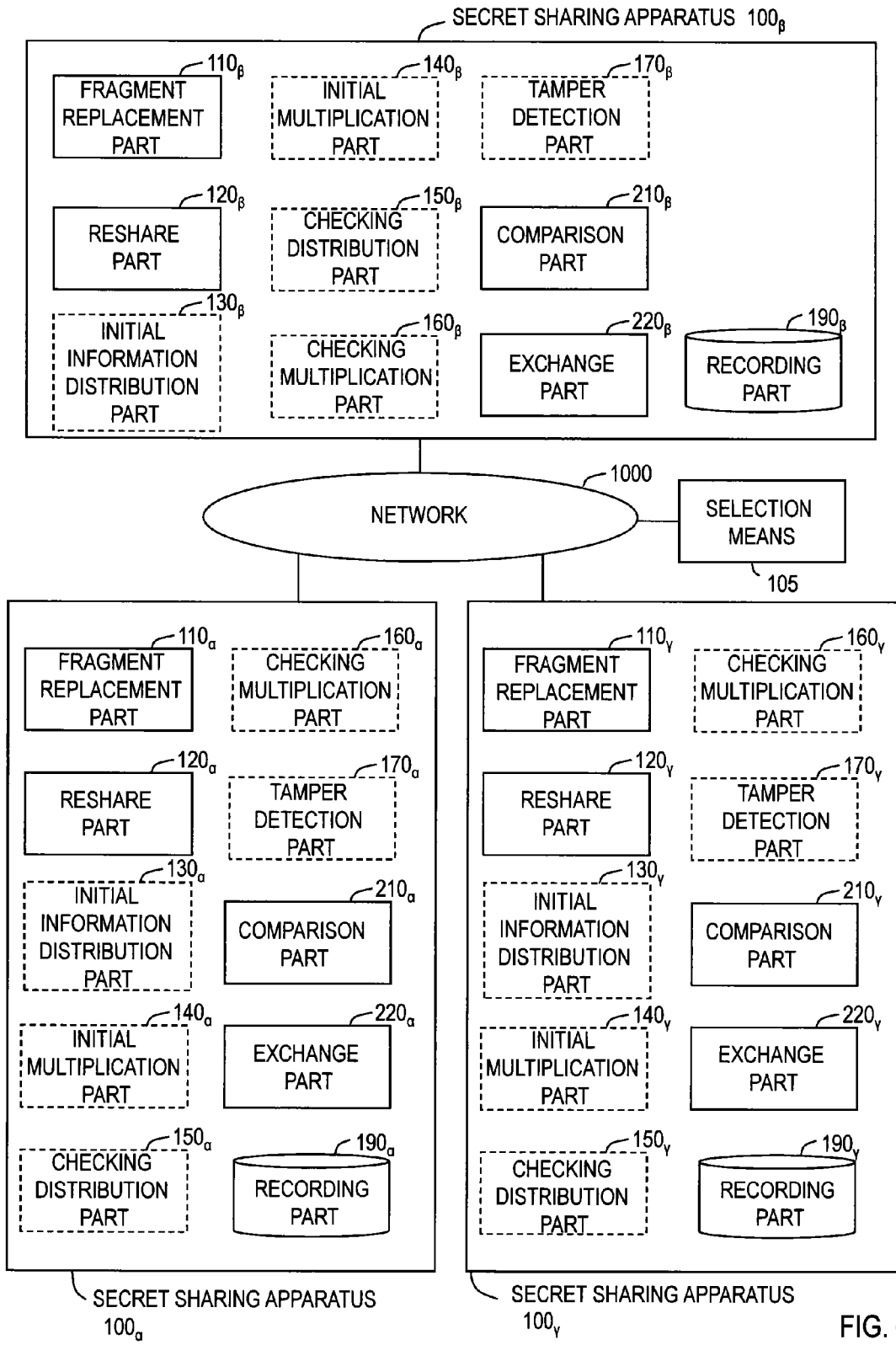
FIG. 6 is a diagram showing an example of a functional configuration of secret sharing systems according to third and fourth embodiments.
Figure 7:
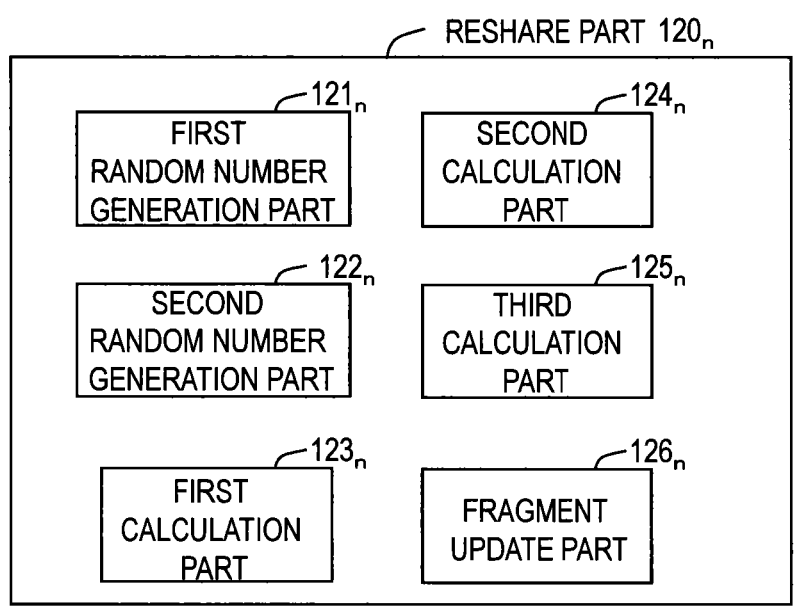
FIG. 7 is a diagram showing an example of a specific configuration of reshare parts according to the third and fourth embodiments.
Figure 8:
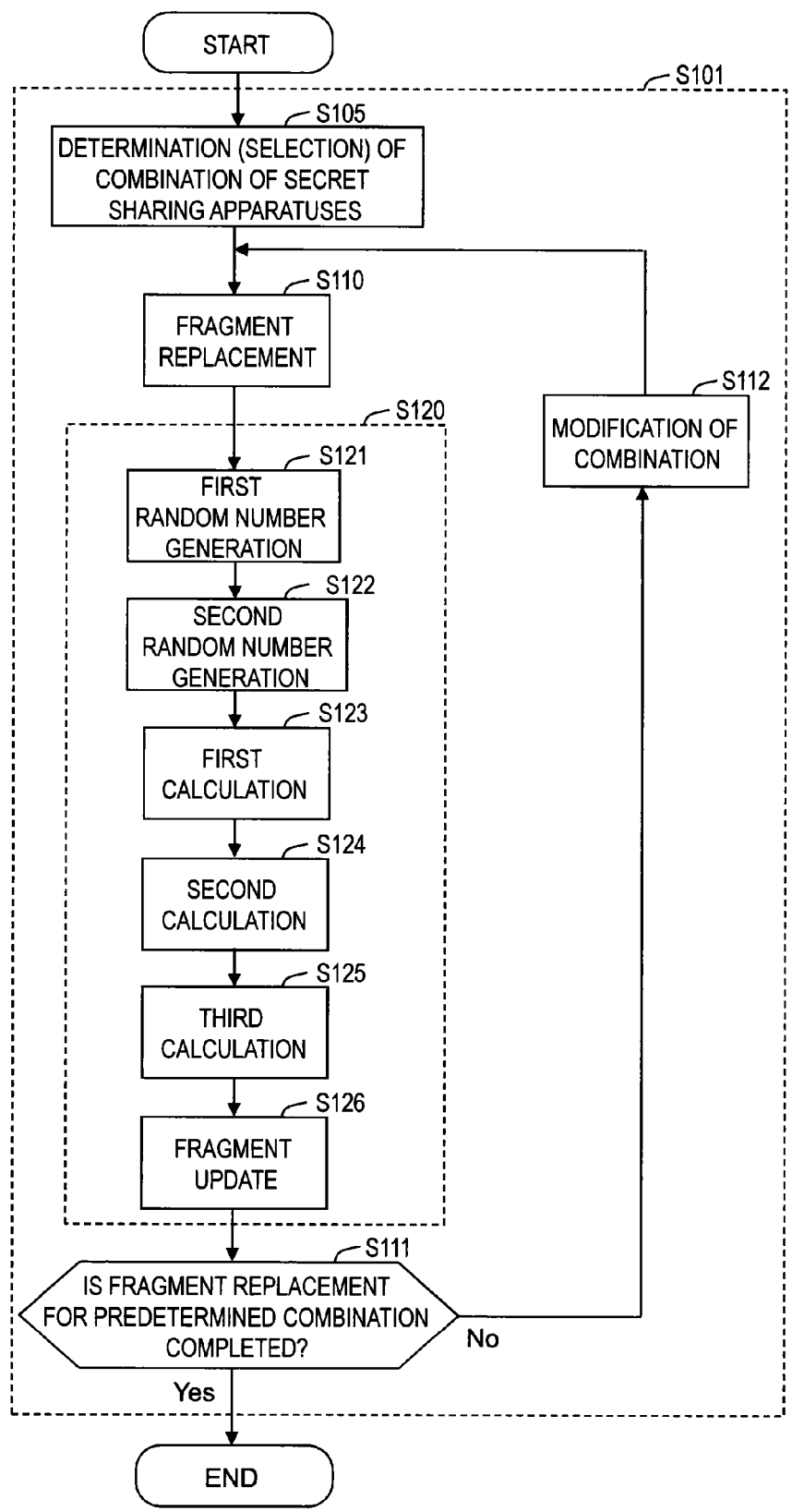
FIG. 8 is a diagram showing a flow of a secret sharing process performed by the secret sharing system according to the third embodiment.

FIG. 6 shows an example of a functional configuration of a secret sharing system according to the third embodiment. FIG. 7 shows an example of a specific configuration of a reshare part according to the third embodiment. FIG. 8 shows a flow of a secret sharing process performed by the secret sharing system according to the third embodiment. The secret sharing system according to this embodiment comprises 3 secret sharing apparatuses $100_\alpha$, $100_\beta$, and $100_\gamma$ and selection means 105. It is assumed that a numeric value $A_k$ that satisfies a relation $A_k = a_{k\alpha\beta} + a_{k\beta\gamma} + a_{k\gamma\alpha}$ is a k-th numeric value of K numeric values (K represents an integer equal to or greater than 2, k represents an integer equal to or greater than 1 and equal to or smaller than K, and $(\alpha, \beta, \gamma)$ is any of $(1, 2, 3)$, $(2, 3, 1)$ and $(3, 1, 2)$), and the three fragments of the numeric value is denoted as $(a_{k\gamma\alpha}, a_{\alpha\beta})$, $(a_{k\alpha\beta}, a_{k\beta\gamma})$, and $(a_{k\beta\gamma}, a_{k\gamma\alpha})$. The selection means 105 may be provided in any of the secret sharing apparatuses or provided as a separate apparatus.

The secret sharing system according to this embodiment comprises the selection means 105, fragment replacement means and reshare means. Each secret sharing apparatus $100_n$ comprises a fragment replacement part $110_n$, a reshare part $120_n$ and a recording part $190_n$ (n represents any of $\alpha$, $\beta$ and $\gamma$). The recording part $190_n$ records fragments of numeric values $A_1, \ldots,$ and $A_K$, for example.

The selection means 105 selects two secret sharing apparatuses. And one of the secret sharing apparatuses selected by the selection means 105 is designated as a first secret sharing apparatus $100_1$, the other is designated as a second secret sharing apparatus $100_2$, and the secret sharing apparatus that is not selected is designated as a third secret sharing apparatus $100_3$ (S105). The k-th fragment recorded in the first secret sharing apparatus $100_1$ is denoted as $a_{k1} = (a_{k31}, a_{k12})$, the k-th fragment recorded in the second secret sharing apparatus $100_2$ is denoted as $a_{k2} = (a_{k12}, a_{k23})$, and the k-th fragment recorded in the third secret sharing apparatus $100_3$ is denoted as $a_{k3} = (a_{k23}, a_{k31})$.

The fragment replacement means comprises at least fragment replacement parts $110_\alpha$, $100_\beta$ and $100_\gamma$. The fragment replacement means generates a bijection $\pi$ of $\{1, \ldots, K\} \rightarrow \{1, \ldots, K\}$ in the first secret sharing apparatus $100_1$ or the second secret sharing apparatus $100_2$, designates a fragment $a_{\pi(k)1}$ recorded in the first secret sharing apparatus $100_1$ as the k-th fragment, and designates a fragment $a_{\pi(k)2}$ recorded in the second secret sharing apparatus $100_2$ as the k-th fragment (S110). As described above in the first embodiment, the bijection $\pi$ may be a mapping of numbers 1 to K randomly rearranged. The bijection $\pi$ is desirably a uniformly randomly rearranged mapping and can be generated by Fisher-Yates shuffle, for example.

The reshare means comprises at least reshare parts $120_\alpha$, $120_\beta$ and $120_\gamma$. As shown in FIG. 7, the reshare part $120_n$ comprises a first random number generation part $121_n$, a second random number generation part $122_n$, a first calculation part $123_n$, a second calculation part $124_n$, a third calculation part $125_n$ and a fragment update part $126_n$.

A first random number generation part $121_1$ of the first secret sharing apparatus $100_1$ generates a random value $b_{k31}$ for reshare of the k-th fragment and transmits the value to the third secret sharing apparatus $100_3$ (S121). A second random number generation part $122_2$ of the second secret sharing apparatus $100_2$ generates a random value $b_{k23}$ for reshare of the k-th fragment and transmits the value to the third secret sharing apparatus $100_3$ (S122). A first calculation part $123_1$ of the first secret sharing apparatus $100_1$ calculates a value $x_k$ according to $x_k = b_{k31} - a_{\pi(k)31}$ for reshare of the k-th fragment and transmits the value $x_k$ to the second secret sharing apparatus $100_2$ (S123).

A second calculation part $124_2$ of the second secret sharing apparatus $100_2$ calculates a value $y_k$ according to $y_k = b_{k23} - a_{\pi(k)23}$ for reshare of the k-th fragment and transmits the value $y_k$ to the first secret sharing apparatus $100_1$ (S124). A third calculation part $125_1$ of the first secret sharing apparatus $100_1$ and a third calculation part $125_2$ of the second secret sharing apparatus $100_2$ each calculate a value $b_{k12}$ according to $b_{k12} = a_{\pi(k)12} - x_k - y_k$ for reshare of the k-th fragment (S125). A fragment update part $126_1$ of the first secret sharing apparatus $100_1$ designates $(b_{k31}, b_{k12})$ as a fragment $b_{k1}$, a fragment update part $126_2$ of the second secret sharing apparatus $100_2$ designates $(b_{k12}, b_{k23})$ as a fragment $b_{k2}$, and a fragment update part $126_3$ of the third secret sharing apparatus $100_3$ designates $(b_{k23}, b_{k31})$ as a fragment $b_{k3}$ (S126). The recording part $190_n$ of each secret sharing apparatus $100_n$ records not only the fragment $b_{kn}$ but also information that the k-th fragment $b_{kn}$ recorded in itself is a fragment of the numeric value $B_k$. As in the first embodiment, the fragments $b_{k1}$, $b_{k2}$ and $b_{k3}$ are fragments of the numeric value $B_k$. That is, Steps S121 to S125 correspond to Step S120.

Furthermore, if the numeric values $B_1, \ldots,$ and $B_K$ are regarded as new numeric values $A_1, \ldots,$ and $A_K$, and the combination of the secret sharing apparatuses selected by the fragment replacement means is modified, the process described above can be repeated (S111 and S112). Furthermore, if the above process is repeated by modifying the combination of the secret sharing apparatuses selected by the fragment replacement part so that every secret sharing apparatus has experience of not being selected at least once, the numeric values $B_1, \ldots,$ and $B_K$ that cannot be associated with the numeric values $A_1, \ldots,$ and $A_K$ by all the secret sharing apparatuses can be obtained. In this embodiment, every secret sharing apparatus can have experience of not being selected at least once if the combinations of the secret sharing apparatuses selected by the fragment replacement means are $\{100_\alpha, 100_\beta\}$, $\{100_\beta, 100_\gamma\}$ and $\{100_\gamma, 100_\alpha\}$.

Thus, the secret sharing system according to the third embodiment has the same effects as the secret sharing system according to the first embodiment. In the case where sorting is also to be performed, the secret sharing apparatus $100_n$ further comprises a comparison part $210_n$ and an exchange part $220_n$. The specific sorting process is the same as that according to the first embodiment.

[Modification of Limited Shuffling]

It is assumed that M represents an integer equal to or greater than 1, and m represents an integer equal to or greater than 1 and equal to or smaller than M. It is further assumed that $A^{(1)}, \ldots,$ and $A^{(M)}$ are vectors each having K elements, and $A^{(m)}=(A_1^{(m)}, \ldots, A_K^{(m)})$. It is further assumed that the elements of the vectors $A^{(1)}, \ldots,$ and $A^{(M)}$ are associated with each other. In other words, $A_k^{(1)}, \ldots,$ and $A_k^{(M)}$ are a group of k-th numeric values associated with each other. In this modification, limited shuffling of the group of numeric values is performed while maintaining the association of the numeric values associated with each other. It is further assumed that $A_k^{(m)}=a_{k\alpha\beta}^{(m)}+a_{k\beta\gamma}^{(m)}+a_{k\gamma\alpha}^{(m)}$ (k represents an integer equal to or greater than 1 and equal to or smaller than K, m represents an integer equal to or greater than 1 and equal to or smaller than M, and $(\alpha, \beta, \gamma)$ is any of $(1, 2, 3), (2, 3, 1)$ and $(3, 1, 2))$, and three fragments are denoted as $(a_{k\gamma\alpha}^{(m)}, a_{k\alpha\beta}^{(m)})$, $(a_{k\alpha\beta}^{(m)}, a_{k\beta\gamma}^{(m)})$, and $(a_{k\beta\gamma}^{(m)}, a_{k\gamma\alpha}^{(m)})$. Note that the limited shuffling described above is the limited shuffling in the case where M=1, and the following description concerns more general limited shuffling.

An example of a functional configuration of the secret sharing system is the same as that shown in FIG. 6, an example of a specific configuration of the reshare part is the same as that shown in FIG. 7, and a flow of the secret sharing process is the same as that shown in FIG. 8. The secret sharing system comprises the selection means 105, the fragment replacement means and the reshare means. The secret sharing apparatus 100$_n$ comprises at least the fragment replacement part 110$_n$, the reshare part 120$_n$ and the recording part 190$_n$ (n represents any of $\alpha$, $\beta$ and $\gamma$). However, the components are configured as described below and perform the processings described below.

The recording part 190$_n$ records fragments $a_{1n}^{(1)}, \ldots, a_{Kn}^{(1)}, \ldots, a_{1n}^{(M)}, \ldots,$ and $a_{Kn}^{(M)}$, for example. The recording part 190$_n$ also records information concerning what number fragment of the numeric value $A_k$ is the fragment $a_{kn}$ recorded in itself.

The selection means 105 selects two secret sharing apparatuses. And one of the secret sharing apparatuses selected by the selection means 105 is designated as a first secret sharing apparatus 100$_1$, the other is designated as a second secret sharing apparatus 100$_2$, and the secret sharing apparatus that is not selected is designated as a third secret sharing apparatus 100$_3$ (S105). The fragment of the numeric value $A_k^{(m)}$ recorded in the first secret sharing apparatus 100$_1$ is denoted as $a_{k1}^{(m)}=(a_{k31}^{(m)}, a_{k12}^{(m)})$, the fragment of the numeric value $A_k^{(m)}$ recorded in the second secret sharing apparatus 100$_2$ is denoted as $a_{k2}^{(m)}=(a_{k12}^{(m)}, a_{k23}^{(m)})$, and the fragment of the numeric value $A_k^{(m)}$ recorded in the third secret sharing apparatus 100$_3$ is denoted as $a_{k3}^{(m)}=(a_{k23}^{(m)}, a_{k31}^{(m)})$.

The fragment replacement means comprises at least the fragment replacement parts 110$_\alpha$, 100$_\beta$ and 100$_\gamma$. The fragment replacement means generates a bijection $\pi$ of $\{1, \ldots, K\} \to \{1, \ldots, K\}$ in the first secret sharing apparatus 100$_1$ or the second secret sharing apparatus 100$_2$, designates fragments $a_{\pi(k)1}^{(1)}, \ldots,$ and $a_{\pi(k)1}^{(M)}$ recorded in the first secret sharing apparatus 100$_1$ as fragments of the group of the k-th numeric values associated with each other and designates fragments $a_{\alpha(k)2}^{(1)}, \ldots,$ and $a_{\pi(k)2}^{(M)}$ recorded in the second secret sharing apparatus 100$_2$ as fragments of the group of the k-th numeric values associated with each other (S110).

The reshare means comprises at least reshare parts 120$_\alpha$, 120$_\beta$ and 120$_\gamma$. As shown in FIG. 7, the reshare part 120$_n$ comprises the first random number generation part 121$_n$, the second random number generation part 122$_n$, the first calculation part 123$_n$, the second calculation part 124$_n$, the third calculation part 125$_n$ and the fragment update part 126$_n$.

The first random number generation part 121$_1$ of the first secret sharing apparatus 100$_1$ generates random values $b_{k31}^{(1)}, \ldots,$ and $b_{k31}^{(M)}$ for reshare of the fragments of the group of k-th numeric values associated with each other and transmits the values $b_{k31}^{(1)}, \ldots,$ and $b_{k31}^{(M)}$ to the third secret sharing apparatus 100$_3$ (S121). The second random number generation part 122$_2$ of the second secret sharing apparatus 100$_2$ generates random values $b_{k23}^{(1)}, \ldots,$ and $b_{k23}^{(M)}$ for reshare of the fragments of the group of k-th numeric values associated with each other and transmits the values $b_{k23}^{(1)}, \ldots,$ and $b_{k23}^{(M)}$ to the third secret sharing apparatus 100$_3$ (S122). The first calculation part 123$_1$ of the first secret sharing apparatus 100$_1$ calculates a value $x_k^{(m)}$ according to $x_k^{(m)}=b_{k31}^{(m)}-a_{\pi(k)31}^{(m)}$ for m=1 to M for reshare of the fragments of the group of the k-th numeric values associated with each other and transmits the values $x_k^{(1)}, \ldots,$ and $x_k^{(M)}$ to the second secret sharing apparatus 100$_2$ (S123).

The second calculation part 124$_2$ of the second secret sharing apparatus 100$_2$ calculates a value $y_k^{(m)}$ according to $y_k^{(m)}=b_{k23}^{(m)}-a_{\pi(k)23}^{(m)}$ for m=1 to M for reshare of the fragments of the group of the k-th numeric values associated with each other and transmits the values $y_k^{(1)}, \ldots,$ and $y_k^{(M)}$ to the first secret sharing apparatus 100$_1$ (S124). The third calculation part 125$_1$ of the first secret sharing apparatus 100$_1$ and the third calculation part 125$_2$ of the second secret sharing apparatus 100$_2$ each calculate a value $b_{k12}^{(m)}$ according to $b_{k12}^{(m)}=a_{\pi(k)12}^{(m)}-x_k^{(m)}-y_k^{(m)}$ for m=1 to M for reshare of the fragments of the group of the k-th numeric values associated with each other (S125). The fragment update part 126$_1$ of the first secret sharing apparatus 100$_1$ designates $(b_{k31}^{(m)}, b_{k12}^{(m)})$ as a fragment $b_{k1}^{(m)}$, the fragment update part 126$_2$ of the second secret sharing apparatus 100$_2$ designates $(b_{k12}^{(m)}, b_{k23}^{(m)})$ as a fragment $b_{k2}^{(m)}$, and the fragment update part 126$_3$ of the third secret sharing apparatus 100$_3$ designates $(b_{k23}^{(m)}, b_{k31}^{(m)})$ as a fragment $b_{k3}^{(m)}$ (S126). The recording part 190$_n$ of each secret sharing apparatus 100$_n$ records not only the fragment $b_{kn}^{(m)}$ but also information that the k-th fragment $b_{kn}^{(m)}$ recorded in itself is a fragment of the numeric value $B_k^{(m)}$. As in the first embodiment, the fragments $b_{k1}^{(m)}, b_{k2}^{(m)}$, and $b_{k3}^{(m)}$ are fragments of the numeric value $B_k^{(m)}$. That is, Steps S121 to S126 correspond to Step S120.

Furthermore, if the numeric values $B_1^{(1)}, \ldots, B_K^{(1)}, \ldots, B_1^{(M)}, \ldots,$ and $B_K^{(M)}$ are regarded as new numeric values $A_1^{(1)}, \ldots, A_K^{(1)}, \ldots, A_1^{(M)}, \ldots,$ and $A_K^{(M)}$, and the combination of the secret sharing apparatuses selected by the fragment replacement means is modified, the process described above can be repeated (S111 and S112).

As described above, if the limited shuffling in which the association of the elements of the vectors is maintained is used, random replacement in the column direction can be performed by regarding each row as one element (a group of numeric values associated with each other) in secret sharing of data in the form of a table, for example.

Fourth Embodiment

In a fourth embodiment, again, the number of the secret sharing apparatuses that form the secret sharing system is limited to 3 for more specific description. In addition, the fourth embodiment described below concerns an example in which an illegal operation detection function is provided as in the second embodiment.

[Limited Shuffling]

Figure 9:
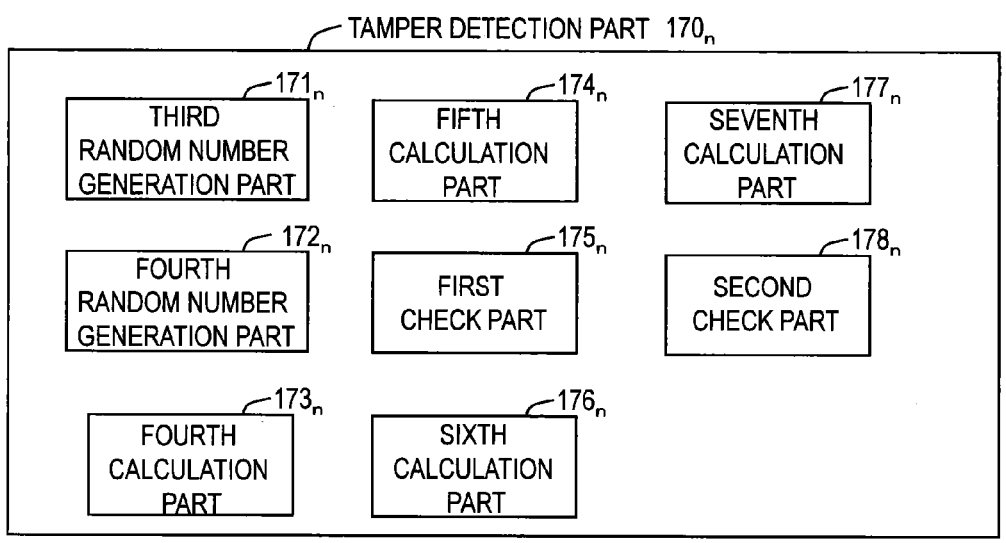
FIG. 9 is a diagram showing a specific structure of a tamper detection part according to the fourth embodiment.
Figure 10:
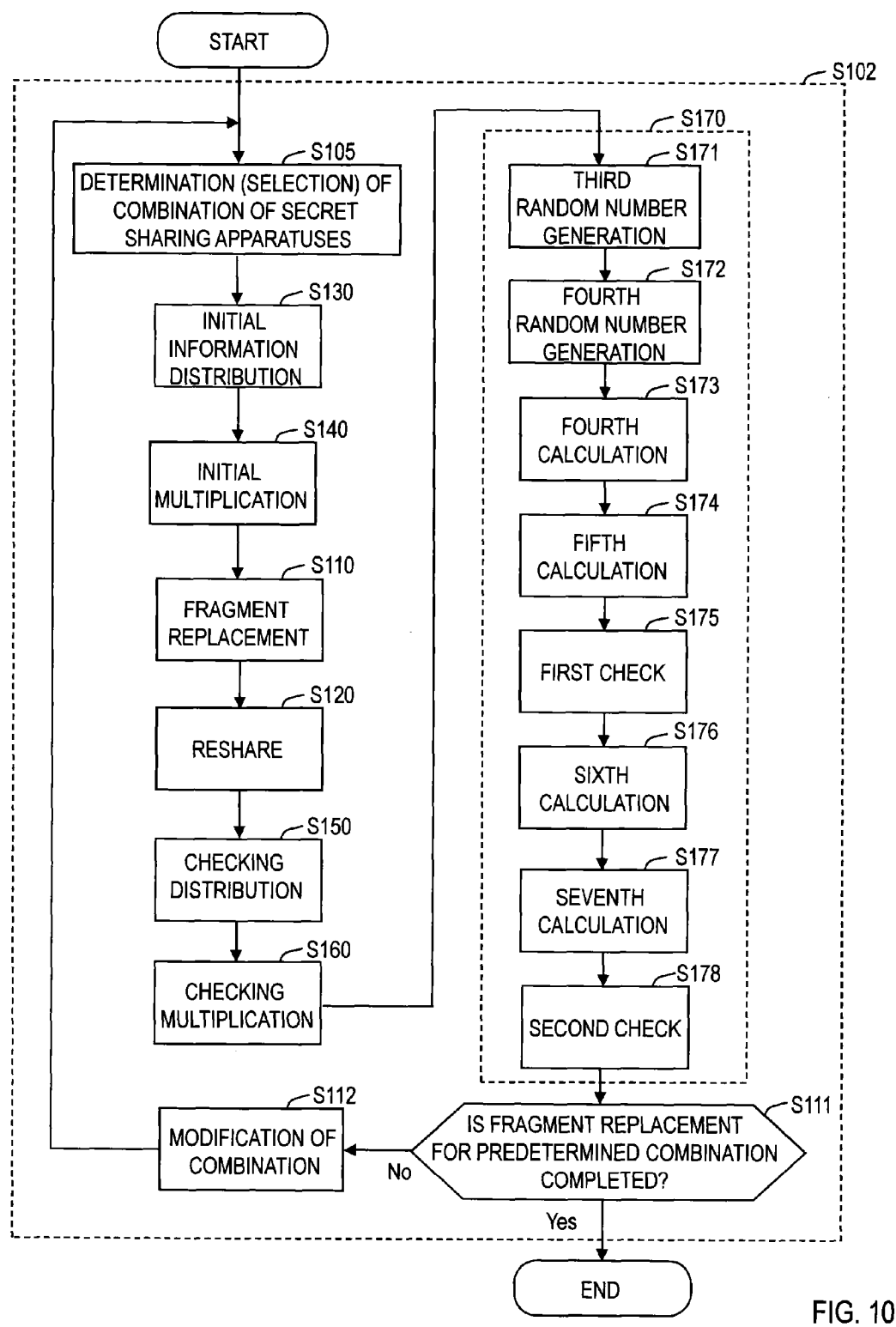
FIG. 10 is a diagram showing a flow of a secret sharing process performed by the secret sharing system according to the fourth embodiment.

A configuration of a secret sharing system according to the fourth embodiment is also shown in FIG. 6. A secret sharing apparatus 100$_n$ according to this embodiment additionally comprises the components shown by dotted lines. FIG. 9 shows a specific structure of a tamper detection part. FIG. 10 shows a flow of a secret sharing process performed by the secret sharing system according to the fourth embodiment. The secret sharing system according to this embodiment comprises 3 secret sharing apparatuses $100_\alpha$, $100_\beta$, and $100_\gamma$ and selection means 105 connected to a network 1000. It is assumed that a numeric value $A_k$ that satisfies a relation $A_k = a_{k\alpha\beta} + a_{k\beta\gamma} + a_{k\gamma\alpha}$ is a k-th numeric value of K numeric values (K represents an integer equal to or greater than 2, k represents an integer equal to or greater than 1 and equal to or smaller than K, and ($\alpha$, $\beta$, $\gamma$) is any of (1, 2, 3), (2, 3, 1) and (3, 1, 2)), and the three fragments of the numeric value is denoted as $(a_{k\gamma\alpha}, a_{k\alpha\beta})$, $(a_{k\alpha\beta}, a_{k\beta\gamma})$, and $(a_{k\beta\gamma}, a_{k\gamma\alpha})$.

The secret sharing system according to this embodiment comprises the selection means 105, initial information distribution means, initial multiplication means, fragment replacement means, reshare means, checking distribution means, checking multiplication means and tamper detection means. The secret sharing apparatus $100_n$ comprises an initial information distribution part $130_n$, an initial multiplication part $140_n$, a fragment replacement part $110_n$, a reshare part $120_n$, a checking distribution part $150_n$, a checking multiplication part $160_n$, a tamper detection part $170_n$ and a recording part $190_n$ (n represents any of $\alpha$, $\beta$ and $\gamma$). The recording part $190_n$ records fragments of numeric values $A_1, \ldots,$ and $A_K$, for example.

The selection means 105 selects two secret sharing apparatuses. And one of the secret sharing apparatuses selected by the selection means 105 is designated as a first secret sharing apparatus $100_1$, the other is designated as a second secret sharing apparatus $100_2$, and the secret sharing apparatus that is not selected is designated as a third secret sharing apparatus $100_3$ (S105). The k-th fragment recorded in the first secret sharing apparatus $100_1$ is denoted as $a_{k1} = (a_{k31}, a_{k12})$, the k-th fragment recorded in the second secret sharing apparatus $100_2$ is denoted as $a_{k2} = (a_{k12}, a_{k23})$, and the k-th fragment recorded in the third secret sharing apparatus $100_3$ is denoted as $a_{k3} = (a_{k23}, a_{k31})$.

The initial information distribution means comprises initial information distribution parts $130_\alpha$, $130_\beta$ and $130_\gamma$. The initial information distribution parts $130_\alpha$, $130_\beta$ and $130_\gamma$ determine a fragment $p_{kn}$ of each of K numeric values $P_1, \ldots,$ and $P_K$ that are not known to any of the secret sharing apparatuses $100_\alpha$, $100_\beta$ and $100_\gamma$ by a secure computation, and the fragment $p_{kn}$ is recorded in the secret sharing apparatus $100_n$ (S130). For example, the first secret sharing apparatus $100_1$ generates K random values $R^{(1)}_1, \ldots,$ and $R^{(1)}_K$, and the second secret sharing apparatus $100_2$ generates K random values $R^{(2)}_1, \ldots,$ and $R^{(2)}_K$. Then, fragments $(r^{(1)}_{k31}, r^{(1)}_{k12})$, $(r^{(1)}_{k12}, r^{(1)}_{k23})$, and $(r^{(1)}_{k23}, r^{(1)}_{k31})$ of the value $R^{(1)}_k$ and fragments $(r^{(2)}_{k31}, r^{(2)}_{k12})$, $(r^{(2)}_{k12}, r^{(2)}_{k23})$, and $(r^{(2)}_{k23}, r^{(2)}_{k31})$ of the value $R^{(2)}_k$ are recorded in the secret sharing apparatuses $100_1$, $100_2$ and $100_3$ in a secret sharing manner. Then, the secret sharing apparatuses $100_1$, $100_2$ and $100_3$ determine fragments $(p_{k31}, p_{k12})$, $(p_{k12}, p_{k23})$, and $(p_{k23}, p_{k31})$ of a numeric value $P_k$ that satisfies a relation that $P_k = R^{(1)}_k + R^{(2)}_k$ by a secure computation, and the fragments are distributed among and recorded in the secret sharing apparatuses $100_1$, $100_2$ and $100_3$. Through this process, fragments of a numeric value that is not known to all the secret sharing apparatuses $100_\alpha$, $100_\beta$ and $100_\gamma$ can be recorded in a distributed manner.

The initial multiplication means comprises initial multiplication parts $140_\alpha$, $140_\beta$ and $140_\gamma$. The initial multiplication parts $140_\alpha$, $140_\beta$ and $140_\gamma$ determine fragments $(s_{k\gamma\alpha}, s_{k\alpha\beta})$, $(s_{k\alpha\beta}, s_{k\beta\gamma})$, and $(s_{k\beta\gamma}, s_{k\gamma\alpha})$ of a numeric value $S_k$ that satisfies a relation that $S_k = P_k \times A_k$ by a secure computation, and the fragments are distributed among and recorded in the secret sharing apparatuses $100_\alpha$, $100_\beta$ and $100_\gamma$ (S140).

The fragment replacement means and the reshare means are the same as those according to the third embodiment. The fragment replacement means and the reshare means serve to record fragments $b_{k1}$, $b_{k2}$, and $b_{k3}$ in the secret sharing apparatuses $100_\alpha$, $100_\beta$ and $100_\gamma$ as fragments of a numeric value $B_k$. The checking distribution means comprises checking distribution parts $150_\alpha$, $150_\beta$ and $150_\gamma$. The checking distribution parts $150_\alpha$, $150_\beta$ and $150_\gamma$ generate fragments $(q_{k\gamma\alpha}, q_{k\alpha\beta})$, $(q_{k\alpha\beta}, q_{k\beta\gamma})$, and $(q_{k\beta\gamma}, q_{k\gamma\alpha})$ of a numeric value $Q_k$ that satisfies a relation that $Q_k = P_{\pi(k)}$ for k=1 to K by a secure computation, and the fragments are distributed among and recorded in the secret sharing apparatuses $100_\alpha$, $100_\beta$ and $100_\gamma$ (S150). For example, other fragments $(r'^{(1)}_{\pi(k)31}, r'^{(1)}_{\pi(k)12})$, $(r'^{(1)}_{\pi(k)12}, r'^{(1)}_{\pi(k)23})$, and $(r'^{(1)}_{\pi(k)23}, r'^{(1)}_{\pi(k)31})$ of the numeric value $R^{(1)}_{\pi(k)}$ generated by the first secret sharing apparatus $100_1$ in Step S130 and other fragments $(r'^{(2)}_{\pi(k)31}, r'^{(2)}_{\pi(k)12})$, $(r'^{(2)}_{\pi(k)12}, r'^{(2)}_{\pi(k)23})$, and $(r'^{(2)}_{\pi(k)23}, r'^{(2)}_{\pi(k)31})$ of the numeric value $R^{(2)}_{\pi(k)}$ generated by the second secret sharing apparatus $100_2$ are recorded in a secret sharing manner Then, the secret sharing apparatuses $100_1$, $100_2$ and $100_3$ generate fragments $(q_{k31}, q_{k12})$, $(q_{k12}, q_{k23})$, and $(q_{k23}, q_{k31})$ of the numeric value $Q_k$ that satisfies a relation that $Q_k = R^{(1)}_{\pi(k)} + R^{(2)}_{\pi(k)}$ by a secure computation using the other fragments, and the fragments are recorded in the secret sharing apparatuses $100_1$, $100_2$ and $100_3$ in a distributed manner. Through the process described above, fragments of a numeric value $Q_k$ that satisfies a relation that $Q_k = P_{\pi(k)}$ and is not known to all the secret sharing apparatuses $100_\alpha$, $100_\beta$ and $100_\gamma$ can be recorded in a distributed manner.

The checking multiplication means comprises checking multiplication parts $160_\alpha$, $160_\beta$ and $160_\gamma$. The checking multiplication parts $160_\alpha$, $160_\beta$ and $160_\gamma$ determine fragments $(t_{k\gamma\alpha}, t_{k\alpha\beta})$, $(t_{k\alpha\beta}, t_{k\beta\gamma})$, and $(t_{k\beta\gamma}, t_{k\gamma\alpha})$ of a numeric value $T_k$ that satisfies a relation that $T_k = Q_k \times B_k$ by a secure computation, and the fragments are recorded in the secret sharing apparatuses $100_\alpha$, $100_\beta$ and $100_\gamma$ in a distributed manner (S160).

The tamper detection means comprises tamper detection parts $170_\alpha$, $170_\beta$ and $170_\gamma$. As shown in FIG. 9, the tamper detection part $170_n$ comprises a third random number generation part $171_n$, a fourth random number generation part $172_n$, a fourth calculation part $173_n$, a fifth calculation part $174_n$, a first check part $175_n$, a sixth calculation part $176_n$, a seventh calculation part $177_n$ and a second check part $178_n$. The tamper detection means performs a processing as described below depending on which of the first secret sharing apparatus $100_1$, the second secret sharing apparatus $100_2$ and the secret sharing apparatus $100_3$ the secret sharing apparatuses $100_\alpha$, $100_\beta$ and $100_\gamma$ operate as.

A third random number generation part $171_1$ of the first secret sharing apparatus $100_1$ generates a random number $u_k$ and transmits the random number to the second secret sharing apparatus $100_2$ (S171). A fourth random number generation part $172_2$ of the second secret sharing apparatus $100_2$ generates a random number $v_k$ and transmits the random number $v_k$ to the first secret sharing apparatus $100_1$ (S172). The fourth calculation part $173_1$ of the first secret sharing apparatus $100_1$ calculates a value $d_k$ according to $d_k = s_{\pi(k)12} - t_{k12} - u_k - v_k$ and transmits the value $d_k$ to the third secret sharing apparatus $100_3$ (S173).

A fifth calculation part $174_2$ of the second secret sharing apparatus $100_2$ calculates a value $e_k$ according to $e_k = s_{\pi(k)12} - t_{k12} - u_k - v_k$ and transmits the value $e_k$ to the third secret sharing apparatus $100_3$ (S174). A first check part $175_3$ of the third secret sharing apparatus $100_3$ checks whether a relation $d_k = e_k$ holds and terminates the processing if the relation does not hold (S175).

A sixth calculation part $176_1$ of the first secret sharing apparatus $100_1$ calculates a value $f_k$ according to $f_k = s_{\pi(k)31} - t_{k31} + u_k$ and transmits the value $f_k$ to the third secret sharing apparatus $100_3$ (S176). A seventh calculation part $177_2$ of the second secret sharing apparatus $100_2$ calculates a value $g_k$ according to $g_k = s_{\pi(k)23} - t_{k23} + v_k$ and transmits the value $g_k$ to the third secret sharing apparatus $100_3$ (S177). A second check part $178_3$ of the third secret sharing apparatus $100_3$ checks whether a relation that $f_k + g_k + d_k = 0$ holds and terminates the processing if the relation does not hold (S178). If the numeric values $B_1, \ldots,$ and $B_K$ are regarded as new numeric values $A_1, \ldots,$ and $A_K$, and the combination of the secret sharing apparatuses selected by the fragment replacement means is modified, the process described above can be repeated (S111 and S112).

The secret sharing system according to the fourth embodiment has the same effects as the secret sharing apparatus according to the third embodiment and can check whether an illegal operation to transmit a tampered value to other secret sharing apparatuses has not occurred in the course of a process of concealing the association between the numeric values $A_1, \ldots,$ and $A_K$ and the numeric values $B_1, \ldots,$ and $B_K$. In the case where sorting is also to be performed, the secret sharing apparatus $100_n$ further comprises a comparison part $210_n$ and an exchange part $220_n$. The specific sorting process is the same as that according to the first embodiment.

[Secret Calculation]

In the above description, it has been assumed that the secure computation is not limited to a particular method, and no specific example has been shown. In the following, a specific example of a basic secure computation that can be used in each component of the secret sharing systems according to the third and fourth embodiments will be described. In the following description, it will be assumed that fragments of a numeric value A recorded in the secret sharing apparatuses $100_\alpha$, $100_\beta$ and $100_\gamma$ in a distributed manner are denoted as $(a_{\gamma\alpha}, a_{\alpha\beta})$, $(a_{\alpha\beta}, a_{\beta\gamma})$, and $(a_{\beta\gamma}, a_{\gamma\alpha})$, fragments of a numeric value B recorded in the secret sharing apparatuses $100_\alpha$, $100_\beta$ and $100_\gamma$ in a distributed manner are denoted as $(b_{\gamma\alpha}, b_{\alpha\beta})$, $(b_{\alpha\beta}, b_{\beta\gamma})$, and $(b_{\beta\gamma}, b_{\gamma\alpha})$, and fragments of a numeric value C recorded in the secret sharing apparatuses $100_\alpha$, $100_\beta$ and $100_\gamma$ in a distributed manner are denoted as $(c_{\gamma\alpha}, c_{\alpha\beta})$, $(c_{\alpha\beta}, c_{\beta\gamma})$, and $(c_{\beta\gamma}, c_{\gamma\alpha})$.

Secret Sharing of Numeric Value A (1) Random numbers $a_{\alpha\beta}$, $a_{\beta\gamma}$ are generated.

(2) A value $a_{\gamma\alpha}$ is calculated according to $a_{\gamma\alpha} = A - a_{\alpha\beta} - a_{\beta\gamma}$, $(a_{\gamma\alpha}, a_{\alpha\beta})$, $(a_{\alpha\beta}, a_{\beta\gamma})$, and $(a_{\beta\gamma}, a_{\alpha\alpha})$ are designated as fragments of the value A, and the fragments $(a_{\gamma\alpha}, a_{\alpha\beta})$, $(a_{\alpha\beta}, a_{\beta\gamma})$, and $(a_{\beta\gamma}, a_{\gamma\alpha})$ are distributed among and recorded in the secret sharing apparatuses $100_\alpha$, $100_\beta$ and $100_\gamma$.

Reconstruction of Numeric Value A (1) The secret sharing apparatus $100_\alpha$ transmits the value $a_{\gamma\alpha}$ to the secret sharing apparatus $100_\beta$ and transmits the value $a_{\alpha\beta}$ to the secret sharing apparatus $100_\gamma$. The secret sharing apparatus $100_\beta$ transmits the value $a_{\alpha\beta}$ to the secret sharing apparatus $100_\gamma$ and transmits the value $a_{\beta\gamma}$ to the secret sharing apparatus $100_\alpha$. The secret sharing apparatus $100_\gamma$ transmits the value $a_{\beta\gamma}$ to the secret sharing apparatus $100_\alpha$ and transmits the value $a_{\gamma\alpha}$ to the secret sharing apparatus $100_\beta$.

(2) The secret sharing apparatus $100_\alpha$ calculates a value $a_{\alpha\beta} + a_{\beta\gamma} + a_{\gamma\alpha}$ to reconstruct the numeric value A if the value $a_{\beta\gamma}$ received from the secret sharing apparatus $100_\beta$ and the value $a_{\beta\gamma}$ received from the secret sharing apparatus $100_\gamma$ agree with each other. The secret sharing apparatus $100_\beta$ calculates the value $a_{\alpha\beta} + a_{\beta\gamma} + a_{\gamma\alpha}$ to reconstruct the numeric value A if the value $a_{\gamma\alpha}$ received from the secret sharing apparatus $100_\gamma$ and the value $a_{\gamma\alpha}$ received from the secret sharing apparatus $100_\alpha$ agree with each other. The secret sharing apparatus $100_\gamma$ calculates the value $a_{\alpha\beta} + a_{\beta\gamma} + a_{\gamma\alpha}$ to reconstruct the numeric value A if the value $a_{\alpha\beta}$ received from the secret sharing apparatus $100_\alpha$ and the value $a_{\alpha\beta}$ received from the secret sharing apparatus $100_\beta$ agree with each other.

Secret Calculation of C=A+B (1) The secret sharing apparatus $100_\alpha$ calculates the fragment $(c_{\gamma\alpha}, c_{\alpha\beta}) = (a_{\gamma\alpha} + b_{\gamma\alpha}, a_{\alpha\beta} + b_{\alpha\beta})$ and records the fragment $(c_{\gamma\alpha}, c_{\alpha\beta})$, the secret sharing apparatus $100_\beta$ calculates the fragment $(c_{\alpha\beta}, c_{\beta\gamma}) = (a_{\alpha\beta} + b_{\alpha\beta}, a_{\beta\gamma} + b_{\beta\gamma})$ and records the fragment $(c_{\alpha\beta}, c_{\beta\gamma})$, and the secret sharing apparatus $100_\gamma$ calculates the fragment $(c_{\beta\gamma}, c_{\gamma\alpha}) = (a_{\beta\gamma} + b_{\beta\gamma}, a_{\gamma\alpha} + b_{\gamma\alpha})$ and records the fragment $(c_{\beta\gamma}, c_{\gamma\alpha})$.

Secret Calculation of C=A−B (1) The secret sharing apparatus $100_\alpha$ calculates the fragment $(c_{\gamma\alpha}, c_{\alpha\beta}) = (a_{\gamma\alpha} - b_{\gamma\alpha}, a_{\alpha\beta} - b_{\alpha\beta})$ and records the fragment $(c_{\gamma\alpha}, c_{\alpha\beta})$, the secret sharing apparatus $100_\beta$ calculates the fragment $(c_{\alpha\beta}, c_{\beta\gamma}) = (a_{\alpha\beta} - b_{\alpha\beta}, a_{\beta\gamma} - b_{\beta\gamma})$ and records the fragment $(c_{\alpha\beta}, c_{\beta\gamma})$, and the secret sharing apparatus $100_\gamma$ calculates the fragment $(c_{\beta\gamma}, c_{\gamma\alpha}) = (a_{\beta\gamma} - b_{\beta\gamma}, a_{\gamma\alpha} - b_{\gamma\alpha})$ and records the fragment $(c_{\beta\gamma}, c_{\gamma\alpha})$.

Secret Calculation of C=A+S (S Represents a Known Constant)

(1) The secret sharing apparatus $100_\alpha$ calculates the fragment $(c_{\gamma\alpha}, c_{\alpha\beta}) = (a_{\gamma\alpha} + S, a_{\alpha\beta})$ and records the fragment $(c_{\gamma\alpha}, c_{\alpha\beta})$, and the secret sharing apparatus $100_\gamma$ calculates the fragment $(c_{\beta\gamma}, c_{\gamma\alpha}) = (a_{\gamma\gamma}, a_{\gamma\alpha} + S)$ and records the fragment $(c_{\beta\gamma}, c_{\gamma\alpha})$. The secret sharing apparatus $100_\beta$ does not perform any processing.

Secret Calculation of C=AS (S Represents a Known Constant)

(1) The secret sharing apparatus $100_\alpha$ calculates the fragment $(c_{\gamma\alpha}, x_{\alpha\beta}) = (a_{\gamma\alpha}S, a_{\alpha\beta}S)$ and records the fragment $(c_{\gamma\alpha}, c_{\alpha\beta})$, the secret sharing apparatus $100_\beta$ calculates the fragment $(c_{\alpha\beta}, c_{\beta\gamma}) = (a_{\alpha\beta}S, a_{\beta\gamma}S)$ and records the fragment $(c_{\alpha\beta}, c_{\beta\gamma})$, and the secret sharing apparatus $100_\gamma$ calculates the fragment $(c_{\beta\gamma}, c_{\gamma\alpha}) = (a_{\beta\gamma}S, a_{\gamma\alpha}S)$ and records the fragment $(c_{\beta\gamma}, c_{\gamma\alpha})$.

Secret Calculation of C=AB (1) The secret sharing apparatus $100_\alpha$ generates random numbers $r_1$, $r_2$, and $c_{\gamma\alpha}$ and calculates a value $c_{\alpha\beta}$ according to $c_{\alpha\beta} = (a_{\gamma\alpha} + a_{\alpha\beta})(b_{\gamma\alpha} + b_{\alpha\beta}) - r_1 - r_2 - c_{\gamma\alpha}$. Then, the secret sharing apparatus $100_\alpha$ transmits $(r_1, c_{\alpha\beta})$ to the secret sharing apparatus $100_\beta$ and $(r_2, c_{\gamma\alpha})$ to the secret sharing apparatus $100_\gamma$.

(2) The secret sharing apparatus $100_\beta$ calculates a value y according to $y = a_{\alpha\beta}b_{\beta\gamma} + a_{\beta\gamma}b_{\alpha\beta} + r_1$ and transmits the value y to the secret sharing apparatus $100_\gamma$.

(3) The secret sharing apparatus $100_\gamma$ calculates a value z according to $z = a_{\beta\gamma}b_{\gamma\alpha} + a_{\gamma\alpha}b_{\beta\gamma} + r_2$ and transmits the value z to the secret sharing apparatus $100_\alpha$.

(4) The secret sharing apparatus $100_\beta$ and the secret sharing apparatus $100_\gamma$ each calculates a value $c_{\beta\gamma}$ according to $c_{\beta\gamma} = y + z + a_{\beta\gamma}b_{\beta\gamma}$.

(5) The secret sharing apparatus $100_\alpha$ records the fragment $(c_{\gamma\alpha}, c_{\alpha\beta})$, the secret sharing apparatus $100_\beta$ records the fragment $(c_{\alpha\beta}, c_{\beta\gamma})$, and the secret sharing apparatus $100_\gamma$ records the fragment $(c_{\beta\gamma}, c_{\gamma\alpha})$.

[Program, Recording Medium]

The various processings described above can be performed not only sequentially in the order described above but also in parallel with each other or individually as required or depending on the processing power of the apparatus that performs the processings. Furthermore, of course, other various modifications can be appropriately made to the processings without departing from the spirit of the present invention.

In the case where the configurations described above are implemented by a computer, the specific processings of the functions of the apparatuses are described in a program. The computer executes the program to implement the processings described above.

The program that describes the specific processings can be recorded in a computer-readable recording medium. The computer-readable recording medium may be any type of recording medium, such as a magnetic recording device, an optical disk, a magneto-optical recording medium and a semiconductor memory.

The program may be distributed by selling, transferring or lending a portable recording medium, such as a DVD and a CD-ROM, in which the program is recorded, for example. Alternatively, the program may be distributed by storing the program in a storage device in a server computer and transferring the program from the server computer to other computers via a network.

The computer that executes the program first temporarily stores, in a storage device thereof, the program recorded in a portable recording medium or transferred from a server computer, for example. Then, when performing the processings, the computer reads the program from the storage device and performs the processings according to the read program. In an alternative implementation, the computer may read the program directly from the portable recording medium and perform the processings according to the program. As a further alternative, the computer may perform the processings according to the program each time the computer receives the program transferred from the server computer. As a further alternative, the processings described above may be performed on an application service provider (ASP) basis, in which the server computer does not transmit the program to the computer, and the processings are implemented only through execution instruction and result acquisition. The programs according to the embodiments of the present invention include a quasi-program, which is information to be processed by a computer (such as data that is not a direct instruction to a computer but has a property that defines the processings performed by the computer).

Although a predetermined program is executed on a computer to implement the apparatus according to the present invention in the embodiments described above, at least part of the specific processing may be implemented by hardware.

What is claimed is:

1. A secret sharing system comprising N secret sharing apparatuses,
    wherein it is assumed that N represents an integer equal to or greater than 3, n represents an integer equal to or greater than 1 and equal to or smaller than N, M represents an integer equal to or greater than 1, m represents an integer equal to or greater than 1 and equal to or smaller than M, K represents an integer equal to or greater than 2, k represents an integer equal to or greater than 1 and equal to or smaller than K, numeric values $A_1^{(1)}, \ldots, A_K^{(1)}, \ldots, A_1^{(M)}, \ldots,$ and $A_K^{(M)}$ are K×M numeric values whose fragments are recorded in the secret sharing apparatuses in a distributed manner, numeric values $A_K^{(1)}, \ldots,$ and $A_K^{(M)}$ are a group of k-th numeric values associated with each other, $a_{kn}^{(m)}$ is a fragment of a numeric value $A_k^{(m)}$ recorded in an n-th secret sharing apparatus, and i represents an integer equal to or greater than 1 and equal to or smaller than N that indicates secret sharing apparatuses selected from among the N secret sharing apparatuses, and
    the secret sharing system comprises:
    the plurality of N secret sharing apparatuses, each of which includes at least one processor; and
    a selection apparatus, that includes at least one processor, and which may be one of the secret sharing apparatuses or a separate apparatus, configured to select a number, equal to or greater than 2 and smaller than N, of secret sharing apparatuses,
    wherein the plurality of secret sharing apparatuses selected by the selection apparatus being configured to generate a bijection π of $\{1, \ldots, K\} \to \{1, \ldots, K\}$, which is a mapping of numbers 1 to K rearranged, among the secret sharing apparatuses selected by said selection apparatus and designate and reorder fragments $a_{\pi(k)i}^{(1)}, \ldots,$ and $a_{\pi(k)i}^{(M)}$ of a group of π(k)-th numeric values associated with each other recorded in an i-th selected secret sharing apparatus as fragments of a group of k-th numeric values associated with each other, and
    the plurality of N secret sharing apparatuses being configured to perform reshare of the fragments $a_{\pi(k)i}^{(1)}, \ldots,$ and $a_{\pi(k)i}^{(M)}$ of numeric values $A_{\pi(k)}^{(1)}, \ldots,$ and $A_{\pi(k)}^{(M)}$ that are used as replacements by said plurality of secret sharing apparatuses selected by the selection apparatus to determine new fragments $b_{k1}^{(1)}, \ldots, b_{kN}^{(1)}, \ldots, b_{k1}^{(M)}, \ldots,$ and $b_{kN}^{(M)}$ and designate the fragments $b_{k1}^{(1)}, \ldots, b_{kN}^{(1)}, \ldots, b_{k1}^{(M)}, \ldots,$ and $b_{kN}^{(M)}$ as fragments of numeric values $B_k^{(1)}, \ldots,$ and $B_k^{(M)}$.

2. The secret sharing system according to claim 1, wherein M=1.

3. The secret sharing system according to claim 2,
    the plurality of N secret sharing apparatuses being further configured to
    determine a fragment of each of K numeric values $P_1, \ldots,$ and $P_K$ that are not known to any of N secret sharing apparatuses by a secure computation and records fragments $p_{1n}, \ldots,$ and $p_{Kn}$ in an n-th secret sharing apparatus;
    initial determine fragments $s_{k1}, \ldots,$ and $s_{kN}$ of a numeric value $S_k$ that satisfies a relation that $S_k = P_k \times A_k^{(1)}$ for the N secret sharing apparatuses by a secure computation and records the fragments $s_{k1}, \ldots,$ and $s_{kN}$ in the N secret sharing apparatuses in a distributed manner;
    generate fragments $q_{k1}, \ldots,$ and $q_{kN}$ of a numeric value $Q_k$ that satisfies a relation that $Q_k = P_{\pi(k)}$ for k=1 to K by a secure computation and records the fragments $q_{k1}, \ldots,$ and $q_{kN}$ in the N secret sharing apparatuses in a distributed manner;
    determine fragments $t_{k1}, \ldots,$ and $t_{kN}$ of a numeric value $T_k$ that satisfies a relation that $T_k = Q_k \times B_k^{(1)}$ for the N secret sharing apparatuses by a secure computation and records the fragments $t_{k1}, \ldots,$ and $t_{kN}$ in the N secret sharing apparatuses in a distributed manner; and
    check whether a relation that $T_k = S_{\pi(k)}$ holds or not for k=1 to K.

4. A secret sharing system comprising three secret sharing apparatuses, wherein it is assumed that M represents an integer equal to or greater than 1, m represents an integer equal to or greater than 1 and equal to or smaller than M, K represents an integer equal to or greater than 2, k represents an integer equal to or greater than 1 and equal to or smaller than K, numeric values $A_1^{(1)}, \ldots, A_K^{(1)}, \ldots, A_1^{(M)}, \ldots,$ and $A_K^{(M)}$ are K×M numeric values whose fragments are recorded in the secret sharing apparatuses in a distributed manner, a combination (α, β, γ) is any of combinations (1, 2, 3), (2, 3, 1) and (3, 1, 2), three fragments of the numeric value $A_k^{(m)} = a_{k\alpha\beta}^{(m)} + a_{k\beta\gamma}^{(m)} + a_{k\gamma\alpha}^{(m)}$ are $(a_{k\gamma\alpha}^{(m)}, a_{k\alpha\beta}^{(m)})$, $(a_{k\alpha\beta}^{(m)}, a_{k\beta\gamma}^{(m)})$ and $(a_{k\beta\gamma}^{(m)}, a_{k\gamma\alpha}^{(m)})$, a group of k-th numeric values associated with each other is formed by $A_k^{(1)}, \ldots,$ and $A_k^{(M)}$ and said three fragments are recorded in three secret sharing apparatuses in a distributed manner, and the secret sharing system comprises:
- the three secret sharing apparatuses, each of which includes at least one processor; and
- a selection apparatus, that includes at least one processor, and which may be one of the secret sharing apparatuses or a separate apparatus, configured to select two secret sharing apparatuses, one of the selected secret sharing apparatus being designated as a first secret sharing apparatus, the other of the selected secret sharing apparatus being designated as a second secret sharing apparatus, and the secret sharing apparatus that is not selected being designated as a third secret sharing apparatus,
- the secret sharing apparatuses being configured to
  - designate a fragment of the numeric value $A_k^{(m)}$ recorded in the first secret sharing apparatus as a fragment $a_{k1}^{(m)}=(a_{k31}^{(m)}, a_{k12}^{(m)})$, designates a fragment of the numeric value $A_k^{(m)}$ recorded in the second secret sharing apparatus as a fragment $a_{k2}^{(m)}=(a_{k12}^{(m)}, a_{k23}^{(m)})$, designates a fragment of the numeric value $A_k^{(m)}$ recorded in the third secret sharing apparatus as a fragment $a_{k3}^{(m)}=(a_{k23}^{(m)}, a_{k31}^{(m)})$, generates the bijection $\pi$ of $\{1, \ldots, K\} \to \{1, \ldots, K\}$ in the first secret sharing apparatus or the second secret sharing apparatus, designates fragments $a_{\pi(k)1}^{(1)}, \ldots,$ and $a_{\pi(k)1}^{(M)}$ of the group of $\pi(k)$-th numeric values associated with each other recorded in the first secret sharing apparatus as fragments of the group of k-th numeric values associated with each other, and designates fragments $a_{\pi(k)2}^{(1)}, \ldots,$ and $a_{\pi(k)2}^{(M)}$ of a group of $\pi(k)$-th numeric values associated with each other recorded in the second secret sharing apparatus as fragments of the group of k-th numeric values associated with each other,
  - perform reshare of the fragments $a_{\pi(k)1}^{(1)}, \ldots, a_{\pi(k)3}^{(1)}, \ldots, a_{\pi(k)1}^{(M)}, \ldots,$ and $a_{\pi(k)3}^{(M)}$ of numeric values $A_{\pi(k)}^{(1)}, \ldots,$ and $A_{\pi(k)}^{(M)}$ that are used as replacements by said secret sharing apparatuses for fragment replacement to determine new fragments $b_{k1}^{(1)}, \ldots, b_{k3}^{(1)}, \ldots, b_{k1}^{(M)}, \ldots,$ and $b_{k3}^{(M)}$ and designates the fragments $b_{k1}^{(1)}, \ldots, b_{k3}^{(1)}, \ldots, b_{k1}^{(M)}, \ldots,$ and $b_{k3}^{(M)}$ as fragments of numeric values $B_k^{(1)}, \ldots,$ and $B_k^{(M)}$,
  - generate random numbers $b_{k31}^{(1)}, \ldots,$ and $b_{k31}^{(M)}$ for reshare of the fragments of the group of k-th numeric values associated with each other and transmit the random numbers $b_{k31}^{(1)}, \ldots,$ and $b_{k31}^{(M)}$ to the third secret sharing apparatus if the secret sharing apparatus is the first secret sharing apparatus,
  - generate random numbers $b_{k23}^{(1)}, \ldots,$ and $b_{k23}^{(M)}$ for reshare of the fragments of the group of k-th numeric values associated with each other and transmit the random numbers $b_{k23}^{(1)}, \ldots,$ and $b_{k23}^{(M)}$ to the third secret sharing apparatus if the secret sharing apparatus is the second secret sharing apparatus,
  - calculate a value $x_k^{(m)}$ according to $x_k^{(m)}=b_{k31}^{(m)}-a_{\pi(k)31}^{(m)}$ for m=1 to M for reshare of the fragments of the group of k-th numeric values associated with each other and transmits the values $x_k^{(1)}, \ldots,$ and $x_k^{(M)}$ to the second secret sharing apparatus if the secret sharing apparatus is the first secret sharing apparatus,
  - calculate a value $y_k^{(m)}$ according to $y_k^{(m)}=b_{k23}^{(m)}-a_{\pi(k)23}^{(m)}$ for m=1 to M for reshare of the fragments of the group of k-th numeric values associated with each other and transmit the values $y_k^{(1)}, \ldots,$ and $y_k^{(M)}$ to the first secret sharing apparatus if the secret sharing apparatus is the second secret sharing apparatus,
  - calculate a value $b_{k12}^{(m)}$ according to $b_{k12}^{(m)}=a_{\pi(k)12}^{(m)}-x_k^{(m)}-y_k^{(m)}$ for m=1 to M for reshare of the fragments of the group of k-th numeric values associated with each other if the secret sharing apparatus is the first or second secret sharing apparatus, and
  - designate $(b_{k31}^{(m)}, b_{k12}^{(m)})$ as a fragment $b_{k1}^{(m)}$ if the secret sharing apparatus is the first secret sharing apparatus, designate $(b_{k12}^{(m)}, b_{k23}^{(m)})$ as a fragment $b_{k2}^{(m)}$ if the secret sharing apparatus is the second secret sharing apparatus, and designate $(b_{k23}^{(m)}, b_{k31}^{(m)})$ as a fragment $b_{k3}^{(m)}$ if the secret sharing apparatus is the third secret sharing apparatus, and
  - each of said secret sharing apparatuses records the fragments $b_{k1}^{(m)}$, $b_{k2}^{(m)}$, and $b_{k3}^{(m)}$ as fragments of the numeric value $B_k^{(m)}$.

5. The secret sharing system according to claim 4, wherein M=1.

6. The secret sharing system according to claim 5,
- the secret sharing apparatuses being further configured to:
  - generate K random values $R^{(1)}_1, \ldots,$ and $R^{(1)}_K$ in the first secret sharing apparatus, generates K random values $R^{(2)}_1, \ldots,$ and $R^{(2)}_K$ in the second secret sharing apparatus, record fragments $(r^{(1)}_{k31}, r^{(1)}_{k12})$, $(r^{(1)}_{k12}, r^{(1)}_{k23})$, and $(r^{(1)}_{k23}, r^{(1)}_{k31})$ of the value $R^{(1)}_k$ and fragments $(r^{(2)}_{k31}, r^{(2)}_{k12})$, $(r^{(2)}_{k12}, r^{(2)}_{k23})$, and $(r^{(2)}_{k23}, r^{(2)}_{k31})$ of the value $R^{(2)}_k$ in said three secret sharing apparatuses in a secret sharing manner, determine fragments $(p_{k31}, p_{k12})$, $(p_{k12}, p_{k23})$, and $(p_{k23}, p_{k31})$ of a numeric value $P_k$ that satisfies a relation that $P_k=R^{(1)}_k+R^{(2)}_k$ by a secure computation in said three secret sharing apparatuses, and record the fragments $(p_{k31}, p_{k12})$, $(p_{k12}, p_{k23})$, and $(p_{k23}, P_{k31})$ in said three secret sharing apparatuses in a distributed manner;
  - determine fragments $(s_{k31}, s_{k12})$, $(s_{k12}, s_{k23})$, and $(s_{k23}, s_{k31})$ of a value $S_k$ that satisfies a relation that $S_k=P_k \times A_k^{(1)}$ by a secure computation in said three secret sharing apparatuses and record the fragments $(s_{k31}, s_{k12})$, $(s_{k12}, s_{k23})$, and $(s_{k23}, s_{k31})$ in said three secret sharing apparatuses in a distributed manner;
  - record other fragments $(r'^{(1)}_{\pi(k)31}, r'^{(1)}_{\pi(k)12})$, $(r'^{(1)}_{\pi(k)12}, r'^{(1)}_{\pi(k)23})$, and $(r'^{(1)}_{\pi(k)23}, r'^{(1)}_{\pi(k)31})$ of said numeric value $R^{(1)}_{\pi(k)}$ and other fragments $(r'^{(2)}_{\pi(k)31}, r'^{(2)}_{\pi(k)12})$, $(r'^{(2)}_{\pi(k)12}, r'^{(2)}_{\pi(k)23})$, and $(r'^{(2)}_{\pi(k)23}, r'^{(2)}_{\pi(k)31})$ of said numeric value $R^{(2)}_{\pi(k)}$ in said three secret sharing apparatuses in a distributed manner, determine fragments $(q_{k31}, q_{k12})$, $(q_{k12}, q_{k23})$, and $(q_{k23}, q_{k31})$ of a numeric value $Q_k$ that satisfies a relation that $Q_k=R^{(1)}_{\pi(k)}+R^{(2)}_{\pi(k)}$ by a secure computation using the other fragments in said three secret sharing apparatuses, and record the fragments $(q_{k31}, q_{k12})$, $(q_{k12}, q_{k23})$, and $(q_{k23}, q_{k31})$ in said three secret sharing apparatuses in a distributed manner; and
  - determine fragments $(t_{k31}, t_{k12})$, $(t_{k12}, t_{k23})$, and $(t_{k23}, t_{k31})$ of a numeric value $T_k$ that satisfies a relation that $T_k=Q_k \times B_k^{(1)}$ by a secure computation in said three secret sharing apparatuses and records the fragments $(t_{k31}, t_{k12})$, $(t_{k12}, t_{k23})$, and $(t_{k23}, t_{k31})$ in said three secret sharing apparatuses in a distributed manner,
- wherein fragments recorded in the first secret sharing apparatus are $s_{k1}=(s_{k31}, s_{k12})$ and $t_{k1}=(t_{k31}, t_{k12})$, fragments recorded in the second secret sharing apparatus are $s_{k2}=(s_{k12}, s_{k23})$ and $t_{k2}=(t_{k12}, t_{k23})$, and fragments recorded in the third secret sharing apparatus are $s_{k3}=(s_{k23}, s_{k31})$ and $t_{k3}=(t_{k23}, t_{k31})$,
- each secret sharing apparatus being configured to generate a random number $u_k$ and transmit the random number $u_k$ to the second secret sharing apparatus if the secret sharing apparatus is the first secret sharing apparatus, generate a random number $v_k$ and the random number $v_k$ to the first secret sharing apparatus if the secret sharing apparatus is the second secret sharing apparatus, calculate a value $d_k$ according to $d_k = s_{\pi(k)12} - t_{k12} - u_k - v_k$ and transmit the value $d_k$ to the third secret sharing apparatus if the secret sharing apparatus is the first secret sharing apparatus, calculate a value $e_k$ according to $e_k = s_{\pi(k)12} - t_{k12} - u_k - v_k$ and transmit the value $e_k$ to the third secret sharing apparatus if the secret sharing apparatus is the second secret sharing apparatus, check whether a relation that $d_k = e_k$ holds or not and terminate a processing if the relation does not hold if the secret sharing apparatus is the third secret sharing apparatus, calculate a value $f_k$ according to $f_k = s_{\pi(k)31} - t_{k31} + u_k$ and transmit the value $f_k$ to the third secret sharing apparatus if the secret sharing apparatus is the first secret sharing apparatus, calculate a value $g_k$ according to $g_k = s_{\pi(k)23} - t_{k23} + v_k$ and transmit the value $g_k$ to the third secret sharing apparatus if the secret sharing apparatus is the second secret sharing apparatus, and check whether a relation that $f_k + g_k + d_k = 0$ holds or not and terminate a processing if the relation does not hold if the secret sharing apparatus is the third secret sharing apparatus.

7. A secret sharing apparatus in a secret sharing system comprising three secret sharing apparatuses which are selected as a first secret sharing apparatus, a second secret sharing apparatus and a third secret sharing apparatus, wherein it is assumed that M represents an integer equal to or greater than 1, m represents an integer equal to or greater than 1 and equal or smaller than M, K represents an integer equal to or greater than 2, k represents an integer equal to or greater than 1 and equal to or smaller than K, numeric values $A_1^{(1)}, \ldots, A_K^{(1)}, \ldots, A_1^{(M)}, \ldots,$ and $A_K^{(M)}$ are K×M numeric values whose fragments are recorded in the secret sharing apparatuses in a distributed manner, numeric values $A_K^{(1)}, \ldots,$ and $A_K^{(M)}$ are a group of k-th numeric values associated with each other, a fragment of a numeric value $A_k^{(m)}$ to be recorded is $a_{k1}^{(m)} = (a_{k31}^{(m)}, a_{k12}^{(m)})$ if the secret sharing apparatus is selected as a first secret sharing apparatus, a fragment of the numeric value $A_k^{(m)}$ to be recorded is $a_{k2}^{(m)} = (a_{k12}^{(m)}, a_{k23}^{(m)})$ if the secret sharing apparatus is selected as a second secret sharing apparatus, and a fragment of the numeric value $A_k^{(m)}$ to be recorded is $a_{k3}^{(m)} = (a_{k23}^{(m)}, a_{k31}^{(m)})$ if the secret sharing apparatus is selected as a third secret sharing apparatus, the secret sharing apparatus comprises at least one processor configured to generate a bijection $\pi$ of $\{1, \ldots, K\} \to \{1, \ldots, K\}$ and designate a fragment of a group of $\pi(k)$-th numeric values associated with each other as a fragment of a group of k-th numeric values associated with each other if the secret sharing apparatus is selected as the first secret sharing apparatus or the second secret sharing apparatus, generate random numbers $b_{k31}^{(1)}, \ldots,$ and $b_{k31}^{(M)}$ for reshare of the fragments of the group of k-th numeric values associated with each other and transmits the random numbers $b_{k31}^{(1)}, \ldots,$ and $b_{k31}^{(M)}$ to the third secret sharing apparatus if the secret sharing apparatus is the first secret sharing apparatus, generate random numbers $b_{k23}^{(1)}, \ldots,$ and $b_{k23}^{(M)}$ for reshare of the fragments of the group of k-th numeric values associated with each other and transmits the random numbers $b_{k23}^{(1)}, \ldots,$ and $b_{k23}^{(M)}$ to the third secret sharing apparatus if the secret sharing apparatus is the second secret sharing apparatus, calculate a value $x_k^{(m)}$ according to $x_k^{(m)} = b_{k31}^{(m)} - a_{\pi(k)31}^{(m)}$ for m=1 to M for reshare of the fragments of the group of k-th numeric values associated with each other and transmits the values $x_k^{(1)}, \ldots,$ and $x_k^{(M)}$ to the second secret sharing apparatus if the secret sharing apparatus is the first secret sharing apparatus, calculate a value $y_k^{(m)}$ according to $y_k^{(m)} = b_{k23}^{(m)} - a_{\pi(k)23}^{(m)}$ for m=1 to M for reshare of the fragments of the group of k-th numeric values associated with each other and transmit the values $y_k^{(1)}, \ldots,$ and $y_k^{(M)}$ to the first secret sharing apparatus if the secret sharing apparatus is the second secret sharing apparatus, calculate a value $b_{k12}^{(m)}$ according to $b_{k12}^{(m)} = a_{\pi(k)12}^{(m)} - x_k^{(m)} - y_k^{(m)}$ for m=1 to M for reshare of the fragments of the group of k-th numeric values associated with each other if the secret sharing apparatus is the first or second secret sharing apparatus, and designate $(b_{k31}^{(m)}, b_{k12}^{(m)})$ as a fragment $b_{k1}^{(m)}$ if the secret sharing apparatus is the first secret sharing apparatus, designates $(b_{k12}^{(m)}, b_{k23}^{(m)})$ as a fragment $b_{k2}^{(m)}$ if the secret sharing apparatus is the second secret sharing apparatus, and designates $(b_{k23}^{(m)}, b_{k31}^{(m)})$ as a fragment $b_{k3}^{(m)}$ if the secret sharing apparatus is the third secret sharing apparatus.

8. The secret sharing apparatus according to claim 7, wherein M=1.

9. A secret sharing method, wherein it is assumed that K represents an integer equal to or greater than 2, k represents an integer equal to or greater than 1 and equal to or smaller than K, M represents an integer equal to or greater than 1, m represents an integer equal to or greater than 1 and equal to or smaller than M, $A_1^{(1)}, \ldots, A_K^{(1)}, \ldots, A_1^{(M)}, \ldots,$ and $A_K^{(M)}$ are K×M numeric values, a combination $(\alpha, \beta, \gamma)$ is any of combinations (1, 2, 3), (2, 3, 1) and (3, 1, 2), three fragments of the numeric value $A_k^{(m)} = a_{k\alpha\beta}^{(m)} + a_{k\beta\gamma}^{(m)} + a_{k\gamma\alpha}^{(m)}$ are $(a_{k\gamma\alpha}^{(m)}, a_{k\alpha\beta}^{(m)}), (a_{k\alpha\beta}^{(m)}, a_{k\beta\gamma}^{(m)})$ and $(a_{k\beta\gamma}^{(m)}, a_{k\gamma\alpha}^{(m)})$, a group of k-th numeric values associated with each other is formed by $A_k^{(1)}, \ldots,$ and $A_k^{(M)}$, and three secret sharing apparatuses in which said fragments are recorded in a distributed manner are used, and the secret sharing method comprises:

a selection step of selecting two secret sharing apparatuses, one of the selected secret sharing apparatuses being designated as a first secret sharing apparatus, the other of the selected secret sharing apparatuses being designated as a second secret sharing apparatus, and the secret sharing apparatus that is not selected being designated as a third secret sharing apparatus;

a fragment replacement step of designating a fragment of the numeric value $A_k^{(m)}$ recorded in the first secret sharing apparatus as a fragment $a_{k1}^{(m)} = (a_{k31}^{(m)}, a_{k12}^{(m)})$, designating a fragment of the numeric value $A_k^{(m)}$ recorded in the second secret sharing apparatus as a fragment $a_{k2}^{(m)} = (a_{k12}^{(m)}, a_{k23}^{(m)})$, designating a fragment of the numeric value $A_k^{(m)}$ recorded in the third secret sharing apparatus as a fragment $a_{k3}^{(m)} = (a_{k23}^{(m)}, a_{k31}^{(m)})$, generating a bijection $\pi$ of $\{1, \ldots, K\} \to \{1, \ldots, K\}$ in the first secret sharing apparatus or the second secret sharing apparatus, designating fragments $a_{\pi(k)1}^{(1)}, \ldots,$ and $a_{\pi(k)1}^{(M)}$ of a group of $\pi(k)$-th numeric values associated with each other recorded in the first secret sharing apparatus as fragments of the group of k-th numeric values associated with each other, and designating fragments $a_{\pi(k)2}^{(1)}, \ldots,$ and $a_{\pi(k)2}^{(M)}$ of a group of π(k)-th numeric values associated with each other recorded in the second secret sharing apparatus as fragments of the group of k-th numeric values associated with each other;

a first random number generation step in which the first secret sharing apparatus generates random numbers $b_{k31}^{(1)}, \ldots,$ and $b_{k31}^{(M)}$ for reshare of the fragments of the group of k-th numeric values associated with each other and transmits the random numbers $b_{k31}^{(1)}, \ldots,$ and $b_{k31}^{(M)}$ to the third secret sharing apparatus;

a second random number generation step in which the second secret sharing apparatus generates random numbers $b_{k23}^{(1)}, \ldots,$ and $b_{k23}^{(M)}$ for reshare of the fragments of the group of k-th numeric values associated with each other and transmits the random numbers $b_{k23}^{(1)}, \ldots,$ and $b_{k23}^{(M)}$ to the third secret sharing apparatus;

a first calculation step in which the first secret sharing apparatus calculates a value $x_k^{(m)}$ according to $x_k^{(m)} = b_{k31}^{(m)} - a_{\pi(k)31}^{(m)}$ for m=1 to M for reshare of the fragments of the group of k-th numeric values associated with each other and transmits the values $x_k^{(1)}, \ldots,$ and $x_k^{(M)}$ to the second secret sharing apparatus;

a second calculation step in which the second secret sharing apparatus calculates a value $y_k^{(m)}$ according to $y_k^{(m)} = b_{k23}^{(m)} - a_{\pi(k)23}^{(m)}$ for m=1 to M for reshare of the fragments of the group of k-th numeric values associated with each other and transmits the values $y_k^{(1)}, \ldots,$ and $y_k^{(M)}$ to the first secret sharing apparatus;

a third calculation step in which the first secret sharing apparatus and the second secret sharing apparatus calculate a value $b_{k12}^{(m)}$ according to $b_{k12}^{(m)} = a_{\pi(k)12}^{(m)} - x_k^{(m)} - y_k(m)$ for m=1 to M for reshare of the fragments of the group of k-th numeric values associated with each other; and a fragment update step in which the first secret sharing apparatus designates $(b_{k31}^{(m)}, b_{k12}^{(m)})$ as a fragment $b_{k1}^{(m)}$, the second secret sharing apparatus designates $(b_{k12}^{(m)}, b_{k23}^{(m)})$ as a fragment $b_{k2}^{(m)}$, and the third secret sharing apparatus designates $(b_{k23}^{(m)}, b_{k31}^{(m)})$ as a fragment $b_{k3}^{(m)}$.

10. The secret sharing method according to claim 9, wherein M=1.

11. The secret sharing method according to claim 10, further comprising:

an initial information distribution step in which the first secret sharing apparatus generates K random values $R^{(1)}_1, \ldots,$ and $R^{(1)}_K$, the second secret sharing apparatus generates K random values $R^{(2)}_1, \ldots,$ and $R^{(2)}_K$, said three secret sharing apparatuses record fragments $(r^{(1)}_{k31}, r^{(1)}_{k12})$, $(r^{(1)}_{k12}, r^{(1)}_{k23})$, and $(r^{(1)}_{k23}, r^{(1)}_{k31})$ of the value $R^{(1)}_k$ and fragments $(r^{(2)}_{k31}, r^{(2)}_{k12})$, $(r^{(2)}_{k12}, r^{(2)}_{k23})$, and $(r^{(2)}_{k23}, r^{(2)}_{k31})$ of the value $R^{(2)}_k$ in a secret sharing manner, and said three secret sharing apparatuses determine fragments $(p_{k31}, p_{k12})$, $(p_{k12}, p_{k23})$, and $(p_{k23}, p_{k31})$ of a numeric value $P_k$ that satisfies a relation that $P_k = R^{(1)}_k R^{(2)}_k$ by a secure computation and record the fragments in a distributed manner;

an initial multiplication step in which said three secret sharing apparatuses determine fragments $(s_{k31}, s_{k12})$, $(s_{k12}, s_{k23})$, and $(s_{k23}, s_{k31})$ of a value $S_k$ that satisfies a relation that $S_k = P_k \times A_k^{(1)}$ by a secure computation and record the fragments $(s_{k31}, s_{k12})$, $(s_{k12}, s_{k23})$, and $(s_{k23}, s_{k31})$ in a distributed manner;

a secret sharing update step in which said three secret sharing apparatuses record fragments $b_{k1}$, $b_{k2}$, and $b_{k3}$ obtained by the secret sharing method according to claim 10 as fragments of a numeric value $B_k^{(1)}$;

a checking distribution step in which other fragments $(r'^{(1)}_{\pi(k)31}, r'^{(1)}_{\pi(k)12})$, $(r'^{(1)}_{\pi(k)12}, r'^{(1)}_{\pi(k)23})$, and $(r'^{(1)}_{\pi(k)23}, r'^{(1)}_{\pi(k)31})$ of said numeric value $R^{(1)}_{\pi(k)}$ and other fragments $(r'^{(2)}_{\pi(k)31}, r'^{(2)}_{\pi(k)12})$, $(r'^{(2)}_{\pi(k)12}, r'^{(2)}_{\pi(k)23})$, and $(r'^{(2)}_{\pi(k)23}, r'^{(2)}_{\pi(k)31})$ of said numeric value $R^{(2)}_{\pi(k)}$ are recorded in said three secret sharing apparatuses in a distributed manner, said three secret sharing apparatuses determine fragments $(q_{k31}, q_{k12})$, $(q_{k12}, q_{k23})$, and $(q_{k23}, q_{k31})$ of a numeric value $Q_k$ that satisfies a relation that $Q_k = R^{(1)}_{\pi(k)} + R^{(2)}_{\pi(k)}$ by a secure computation using the other fragments and record the fragments $(q_{k31}, q_{k12})$, $(q_{k12}, q_{k23})$, and $(q_{k23}, q_{k31})$ in a distributed manner; and a checking multiplication step in which said three secret sharing apparatuses determine fragments $(t_{k31}, t_{k12})$, $(t_{k12}, t_{k23})$, and $(t_{k23}, t_{k31})$ of a numeric value $T_k$ that satisfies a relation that $T_k = Q_k \times B_k^{(1)}$ by a secure computation and record the fragments $(t_{k31}, t_{k12})$, $(t_{k12}, t_{k23})$, and $(t_{k23}, t_{k31})$ in a distributed manner, wherein fragments recorded in the first secret sharing apparatus are $s_{k1} = (s_{k31}, s_{k12})$ and $t_{k1} = (t_{k31}, t_{k12})$, fragments recorded in the second secret sharing apparatus are $s_{k2} = (S_{k12}, s_{k23})$ and $t_{k2} = (t_{k12}, t_{k23})$, and fragments recorded in the third secret sharing apparatus are $s_{k3} = (s_{k23}, s_{k31})$ and $t_{k3} = (t_{k23}, t_{k31})$, and the secret sharing method further comprises:

a third random number generation step in which the first secret sharing apparatus generates a random number $u_k$ and transmits the random number $u_k$ to the second secret sharing apparatus;

a fourth random number generation step in which the second secret sharing apparatus generates a random number $v_k$ and transmits the random number $v_k$ to the first secret sharing apparatus;

a fourth calculation step in which the first secret sharing apparatus calculates a value $d_k$ according to $d_k = s_{\pi(k)12} - t_{k12} - u_k - v_k$ and transmits the value $d_k$ to the third secret sharing apparatus;

a fifth calculation step in which the second secret sharing apparatus calculates a value $e_k$ according to $e_k = s_{\pi(k)12} - t_{k12} - u_k - v_k$ and transmits the value $e_k$ to the third secret sharing apparatus;

a first check step in which the third secret sharing apparatus checks whether a relation that $d_k = e_k$ holds or not and terminates a processing if the relation does not hold;

a sixth calculation step in which the first secret sharing apparatus calculates a value $f_k$ according to $f_k = s_{\pi(k)31} - t_{k31} + u_k$ and transmits the value $f_k$ to the third secret sharing apparatus;

a seventh calculation step in which the second secret sharing apparatus calculates a value $g_k$ according to $g_k = s_{\pi(k)23} - t_{k23} + v_k$ and transmits the value $g_k$ to the third secret sharing apparatus; and a second check step in which the third secret sharing apparatus checks whether a relation that $f_k + g_k + d_k = 0$ holds or not and terminates a processing if the relation does not hold.

12. The secret sharing method according claim 9, wherein the fragments $b_{k1}^{(m)}$, $b_{k2}^{(m)}$, and $b_{k3}^{(m)}$ obtained in said fragment update step are regarded as new fragments $a_{k1}^{(m)}$, $a_{k2}^{(m)}$, and $a_{k3}^{(m)}$, and said secret sharing method is repeated until said secret sharing apparatuses are selected in all predetermined combinations in said fragment replacement step.

13. A secret sorting method that uses a secret sharing method according to claim 12, comprising:
- a comparison step in which three secret sharing apparatuses selects two numeric values from a plurality of numeric values whose fragments are recorded in a distributed manner by the secret sharing method according to claim 12 and compare the two numeric values in terms of magnitude by a secure computation; and
- an exchange step in which each secret sharing apparatus exchanges fragments of the numeric values based on a result of said comparison step.

14. A non-transitory computer readable medium including computer executable instructions that make a computer function as a secret sharing apparatus in a secret sharing system according to claim 1.

* * * * *

UNITED STATES PATENT AND TRADEMARK OFFICE
CERTIFICATE OF CORRECTION

PATENT NO. : 8,989,391 B2
APPLICATION NO. : 13/876110
DATED : March 24, 2015
INVENTOR(S) : Koki Hamada et al.

It is certified that error appears in the above-identified patent and that said Letters Patent is hereby corrected as shown below:

Claims

Column 20, line 36, Claim 3 change "initial determine fragments" to --determine fragments--.

Column 22, line 36, Claim 6 change "$(s_{k31}, s_{k12}), (s_{k12}, s_{k23}))$ and" to --$(s_{k31}, s_{k12}), (s_{k12}, s_{k23})$, and--.

Column 23, line 45, Claim 7 change "$a_{k1}^{(m)} = (a_{k31}^{(m)}, a_{k12}^{(m)})$" to --$a_{k1}^{(m)} = (a_{k31}^{(m)}, a_{k12}^{(m)})$--;

Column 23, line 48, Claim 7 change "$a_{k2}^{(m)} = (a_{k12}^{(m)}, a_{k23}^{(m)})$" to --$a_{k2}^{(m)} = (a_{k12}^{(m)}, a_{k23}^{(m)})$--;

Column 23, line 51, Claim 7 change "$a_{k31}^{(m)}$" to --$a_{k31}^{(m)}$--.

Column 24, line 42, Claim 9 change "$(a_{k\gamma\alpha}^{(m)}, a_{k\alpha\beta}^{(m)}, (a_{k\alpha\beta}^{(m)}, a_{k\beta\gamma}^{(m)})$" to --$(a_{k\gamma\alpha}^{(m)}, a_{k\alpha\beta}^{(m)}), (a_{k\alpha\beta}^{(m)}, a_{k\beta\gamma}^{(m)})$--.

Column 25, line 34, Claim 9 change "$x_k^{(m)} - y_k(m)$ for m = 1" to --$x_k^{(m)} - y_k^{(m)}$ for m = 1--.

Signed and Sealed this
Third Day of November, 2015

Michelle K. Lee
*Director of the United States Patent and Trademark Office*